(12) United States Patent
Pettigrew et al.

(10) Patent No.: US 7,693,341 B2
(45) Date of Patent: Apr. 6, 2010

(54) WORKFLOWS FOR COLOR CORRECTING IMAGES

(75) Inventors: Daniel Pettigrew, Pacific Palisades, CA (US); Jean-Pierre Mouilleseaux, Venice, CA (US); Dan Candela, Beverly Hills, CA (US)

(73) Assignee: Apple Inc., Cupertino, CA (US)

( * ) Notice: Subject to any disclaimer, the term of this patent is extended or adjusted under 35 U.S.C. 154(b) by 1020 days.

(21) Appl. No.: 11/409,553

(22) Filed: Apr. 21, 2006

(65) Prior Publication Data

US 2007/0247679 A1    Oct. 25, 2007

(51) Int. Cl.
*J06K 9/36* (2006.01)
(52) U.S. Cl. .................. 382/254; 382/274; 382/275
(58) Field of Classification Search .......... 382/254, 382/260, 274, 275; 358/3.26, 3.27, 463
See application file for complete search history.

(56) References Cited

U.S. PATENT DOCUMENTS

| | | | |
|---|---|---|---|
| 5,519,515 A | 5/1996 | Komatsu | |
| 6,185,325 B1 | 2/2001 | Sakaida et al. | |
| 6,259,428 B1 | 7/2001 | Ramchandani | |
| 6,292,167 B1 | 9/2001 | Throup | |
| 6,292,195 B1 | 9/2001 | Shimizu et al. | |
| 6,323,969 B1 | 11/2001 | Shimizu et al. | |
| 6,362,829 B1 * | 3/2002 | Omvik et al. | 345/593 |
| 6,429,875 B1 | 8/2002 | Pettigrew et al. | |
| 6,445,816 B1 | 9/2002 | Pettigrew | |
| 6,456,300 B1 | 9/2002 | Pettigrew | |
| 6,496,599 B1 | 12/2002 | Pettigrew | |
| 6,571,012 B1 | 5/2003 | Pettigrew | |
| 6,637,861 B2 | 10/2003 | Yamamoto | |
| 6,751,347 B2 | 6/2004 | Pettigrew et al. | |
| 6,754,399 B2 | 6/2004 | Pettigrew et al. | |
| 6,757,425 B2 | 6/2004 | Pettigrew et al. | |
| 6,798,412 B2 | 9/2004 | Cowperthwaite | |
| 6,833,843 B2 * | 12/2004 | Mojaver et al. | 345/647 |
| 6,836,563 B2 | 12/2004 | Dawson | |
| 6,898,309 B2 | 5/2005 | Pettigrew et al. | |
| 6,903,762 B2 * | 6/2005 | Prabhu et al. | 348/207.1 |

(Continued)

FOREIGN PATENT DOCUMENTS

EP    0947956    10/1999

(Continued)

OTHER PUBLICATIONS

PCT International Search Report in corresponding PCT application #PCT/US2007/067144 dated Oct. 12, 2007, 4 pages.

(Continued)

*Primary Examiner*—Yosef Kassa
(74) *Attorney, Agent, or Firm*—Fish & Richardson P.C.

(57) ABSTRACT

The disclosed implementations relate generally to improved workflows for color correcting digital images. In some implementations, a method of correcting images includes: presenting a user interface on a display device, the user interface including a display area; presenting a digital image in the display area; overlaying a correction interface on the digital image; and performing a correction operation on at least a portion of the digital image in response to a user interaction with the correction interface, where the correction operation is performed with real-time responsiveness.

20 Claims, 39 Drawing Sheets

U.S. PATENT DOCUMENTS

| | | | |
|---|---|---|---|
| 6,919,892 B1 * | 7/2005 | Cheiky et al. | 345/473 |
| 6,928,187 B2 | 8/2005 | Cooper et al. | |
| 6,944,335 B2 | 9/2005 | Pettigrew et al. | |
| 7,003,140 B2 * | 2/2006 | Venkatachalam | 382/118 |
| 7,003,178 B2 | 2/2006 | Pettigrew et al. | |
| 7,083,278 B2 * | 8/2006 | Broderick et al. | 351/177 |
| 7,423,791 B2 | 9/2008 | Tin | |
| 2003/0206665 A1 | 11/2003 | Pettigrew | |
| 2004/0264766 A1 | 12/2004 | Pettigrew | |
| 2004/0264767 A1 | 12/2004 | Pettigrew | |
| 2005/0122543 A1 | 6/2005 | Walker | |
| 2005/0140994 A1 | 6/2005 | Hasegawa | |
| 2005/0147314 A1 | 7/2005 | Kokemohr | |
| 2005/0174590 A1 | 8/2005 | Kubo | |
| 2005/0280846 A1 | 12/2005 | Ichitani | |
| 2006/0017855 A1 | 1/2006 | Yamada | |
| 2006/0170682 A1 | 8/2006 | Van Liere | |
| 2007/0188814 A1 | 8/2007 | Walton et al. | |
| 2007/0247475 A1 | 10/2007 | Pettigrew et al. | |
| 2007/0247647 A1 | 10/2007 | Pettigrew et al. | |

FOREIGN PATENT DOCUMENTS

| | | |
|---|---|---|
| JP | 09-069961 | 11/1997 |
| WO | 96/08918 | 3/1996 |

OTHER PUBLICATIONS

Selan, Jeremy, "GPU Gems 2: Chapter 24, Using Lookup Tables to Accelerate Color Transformations", pp. 381-392.

International Preliminary Report on Patentability, dated Oct. 22, 2008, issued in International Application No. PCT/US2007/067144.

Ludlam, "Sliceomatic", downloaded from the Internet on Aug. 12, 2009 at URL: <http://www.mathworks.com/matlabcentral/fileexchange/764>, Sep. 19, 2001 (updated Nov. 18, 2008).

* cited by examiner

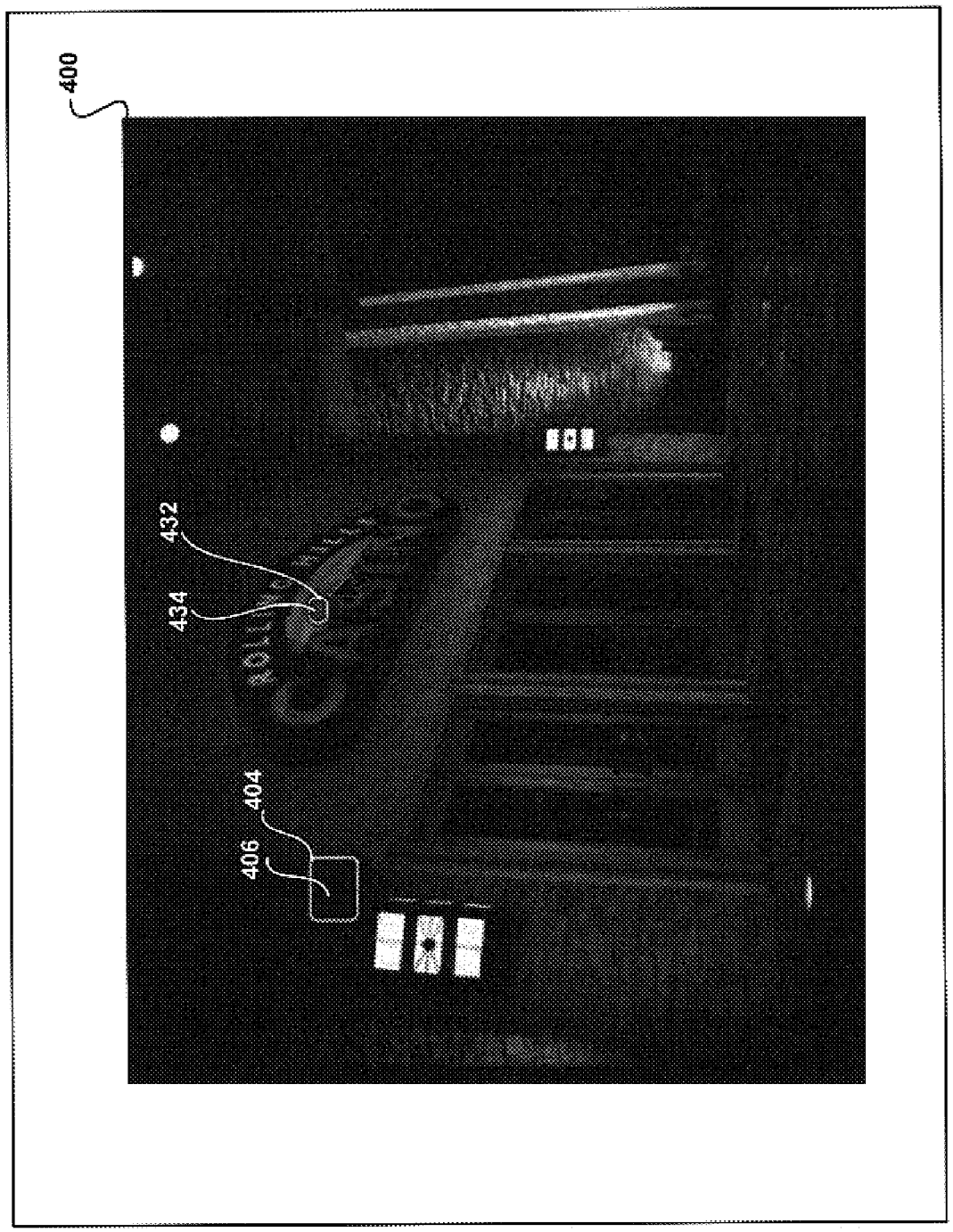

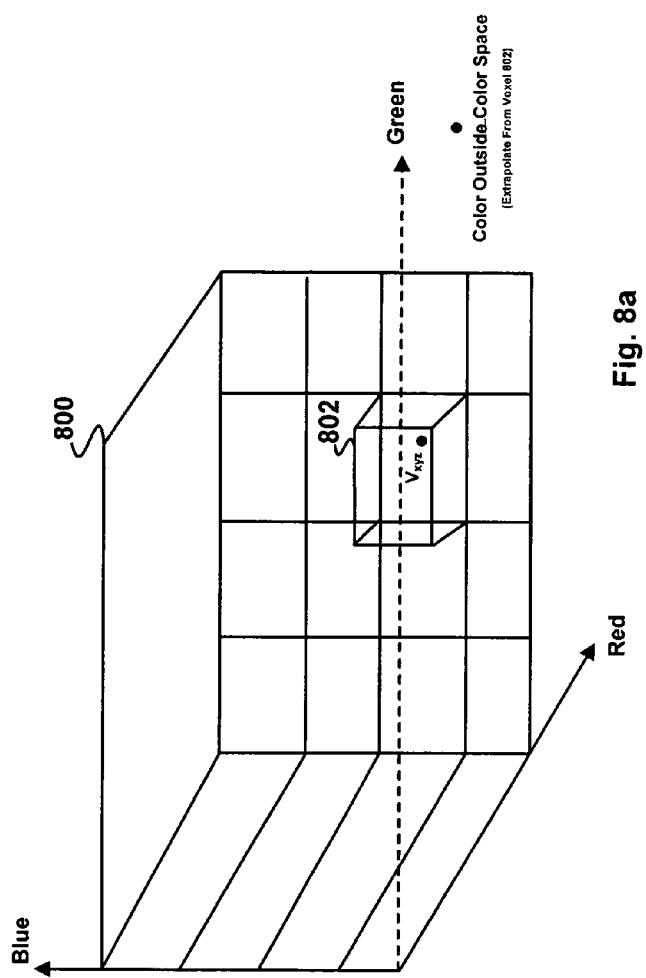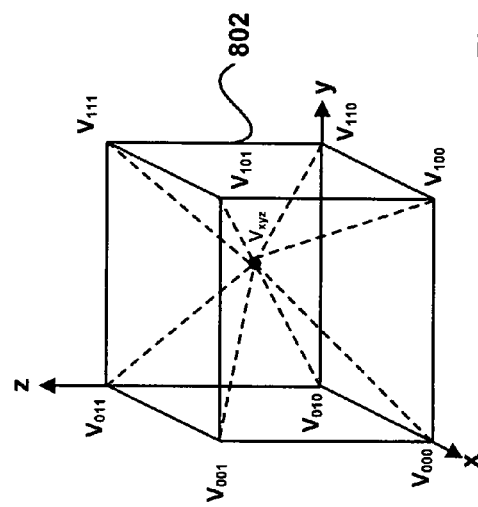

WORKFLOWS FOR COLOR CORRECTING IMAGES

RELATED APPLICATIONS

This patent application is related to co-pending U.S. patent application Ser. No. 11/408,741, entitled "3D Histogram and Other User Interface Elements For Color Correcting Images," filed Apr. 21, 2006, and U.S. patent application Ser. No. 11/408,783, entitled "3D LUT Techniques For Color Correcting Images," filed Apr. 21, 2006. The subject matter of each of these patent applications is incorporated by reference herein in its entirety.

TECHNICAL FIELD

The disclosed implementations are generally related to digital image processing.

BACKGROUND

Color correction tools are used in the film industry and other disciplines to alter the perceived color of an image. Conventional color correction tools typically allow users to perform primary and secondary color corrections. Primary color correction involves correcting the color of an entire image, such as adjusting the blacks, whites or gray tones of the image. Secondary color correction involves correcting a particular color range in an image. For example, a user may want to change the color of an object in an image from red to blue. The user would identify the range of red in the object and then shift the hue to blue. This process could also be applied to other objects in the image.

Conventional color correction tools often provide poor performance when multiple secondary corrections are applied to images due to the computations involved. Users are often forced to render an entire image before seeing the results of a color adjustment. This delay when multiplied by many adjustments can add significant delay to the overall color correction process.

Conventional color correction tools also fail to provide an intuitive workflow that allows users to make multiple fine adjustments without losing context. For example, the image to be color corrected may be displayed in a different window than the correction interface used to make the corrections, forcing the user to repeatedly take their eyes off of the image while making adjustments. Additionally, a user may have to select an appropriate range for one or more color correction parameters (e.g., luminance, hue, saturation, etc.) because the default or preset ranges for the parameters are not sufficient for the task at hand.

Many color correction tasks are most easily accomplished through the use of several tools. Unfortunately, many conventional color correction tools make it difficult to accomplish even simple tasks by scattering the tools over several user interfaces, menus, layers, etc. The failure to combine, tie or link tools together based on the task can interrupt workflow.

SUMMARY

The disclosed implementations relate generally to improved workflows for color correcting digital images.

In some implementations, a method of correcting images includes: presenting a user interface on a display device, the user interface including a display area; presenting a digital image in the display area; overlaying a correction interface on the digital image; and performing a correction operation on at least a portion of the digital image in response to a user interaction with the correction interface, where the correction operation is performed with real-time responsiveness.

In some implementations, a computer-readable medium includes instructions which, when executed by a processor, causes the processor to perform the operations of: presenting a user interface on a display device, the user interface including a display area; presenting a digital image in the display area; overlaying a correction interface on the digital image; and performing a correction operation on at least a portion of the digital image in response to a user interaction with the correction interface, wherein the correction operation is performed with real-time responsiveness.

In some implementations, a system for color correcting images includes a display engine configurable for presenting a digital image on a display device and for presenting a correction interface overlying the digital image. A correction engine is coupled to the display engine. The correction engine is configurable for performing a correction operation on at least a portion of the digital image in response to a user interaction with the correction interface, where the correction operation is performed with real-time responsiveness.

Other implementations are disclosed that are directed to methods, systems, apparatuses, computer-readable mediums, devices and user interfaces.

DESCRIPTION OF DRAWINGS

FIGS. 4a-4i are screenshots illustrating exemplary workflows for adjusting the colors falling in a range of luminance and a range of hue of a digital image using a selected range.

FIGS. 8a and 8b illustrate the concept of 3D LUTs for use in color correction.

DETAILED DESCRIPTION

Region Selection

Figure 1:
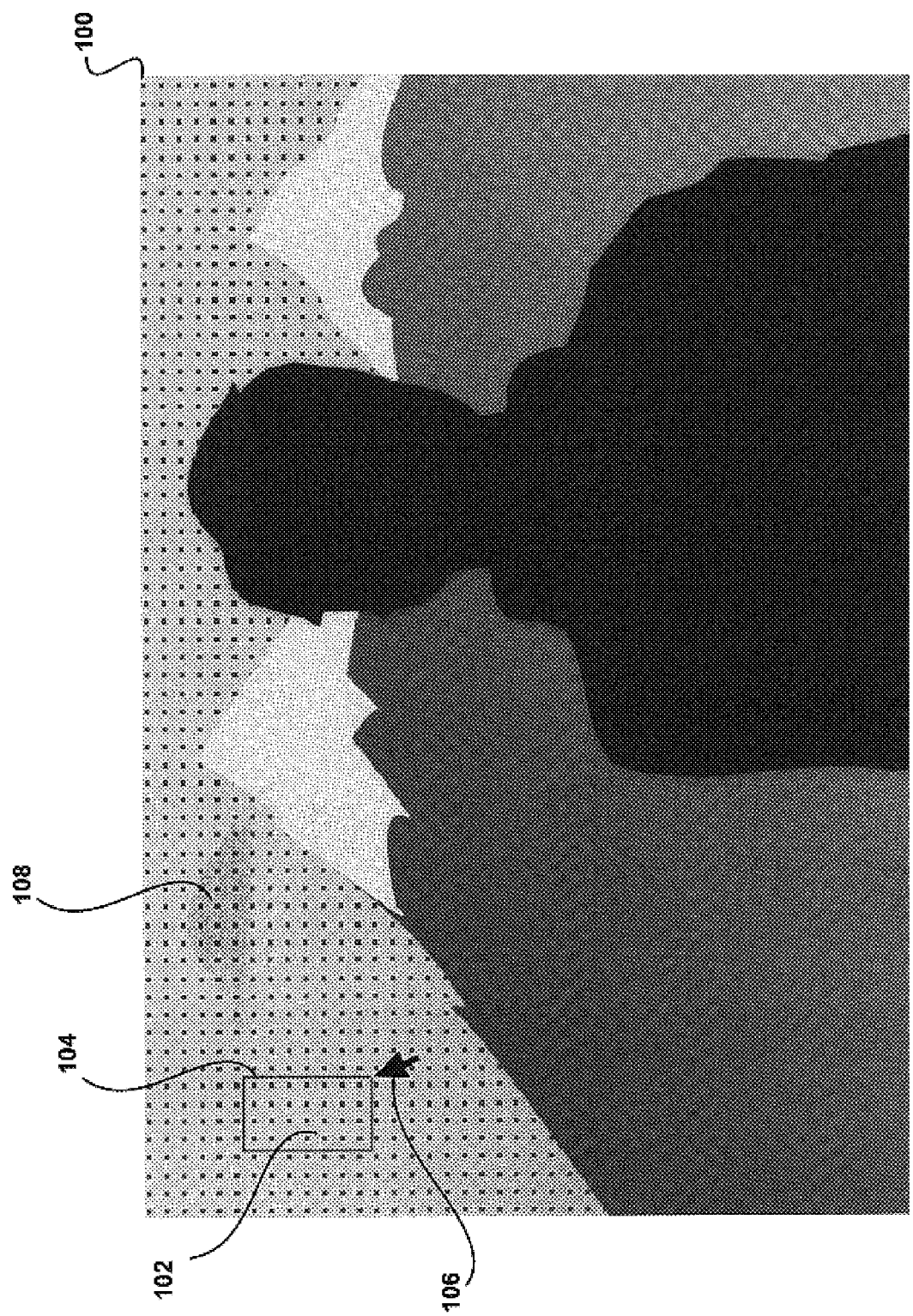
FIG. 1 illustrates an exemplary process for selecting a region in a digital image for use in color correction.

FIG. 1 illustrates an exemplary process for selecting a region 102 in a digital image 100 for use in color correction. In some implementations, the user selects the region 102 in the digital image 100 by dragging a bounding box 104 over the region 102. The region 102 includes colors that can be characterized as being in a range of hue, luminance and/or saturation values. The user can click on a corner or side of the bounding box 104 with a cursor 106, then drag the cursor 106 across the digital image 100 to change the size of the bounding box 104. The user can also click in the interior of the bounding box 104 with the cursor 106, then drag the cursor 106 across the digital image 100 to translate the position of the bounding box 104.

In some implementations, a dot overlay 108 (or other visual cue) is displayed over select portions of the digital image 100 to indicate the positions of pixels in the digital image 100 that have values that fall within the range of pixel values defined by the region 102. For example, the dot overlay 108 can be displayed over each portion of the digital image 100 that contains the same luminance range as the region 102, so the user is provided with a visual indication of how the luminance range in the region 102 is distributed throughout the digital image 100. In some implementations, the density of the region 102 is indicated by the size of the dots in the dot overlay 108. As the user drags the cursor 106 over the digital image 100 to translate or resize the bounding box 104, the dot size and location in the overlay 108 is updated to indicate the newly selected region 102.

The visual cues provided by the dot overlay 108 facilitates modification of the selection by the user. The color or size of the dots can be altered to improve the visibility of the dot overlay 108 over the digital image 100. For example, to improve the visibility of the dot overlay 108 on a white or light background, the dots are painted black to contrast against the white or light background. Similarly, the dots can be painted white to contrast against a black or dark background (e.g., shadows). In FIG. 1, the dots are painted black to improve visibility of the dot overlay 108 on the "sky" portion of the digital image 100. The dots can be circles, rectangles, squares, diamonds or any other shape or pattern. Other selection overlay styles are possible (e.g., matte, quick mask, marching ants, etc.)

Correction Interface

Figure 2A:
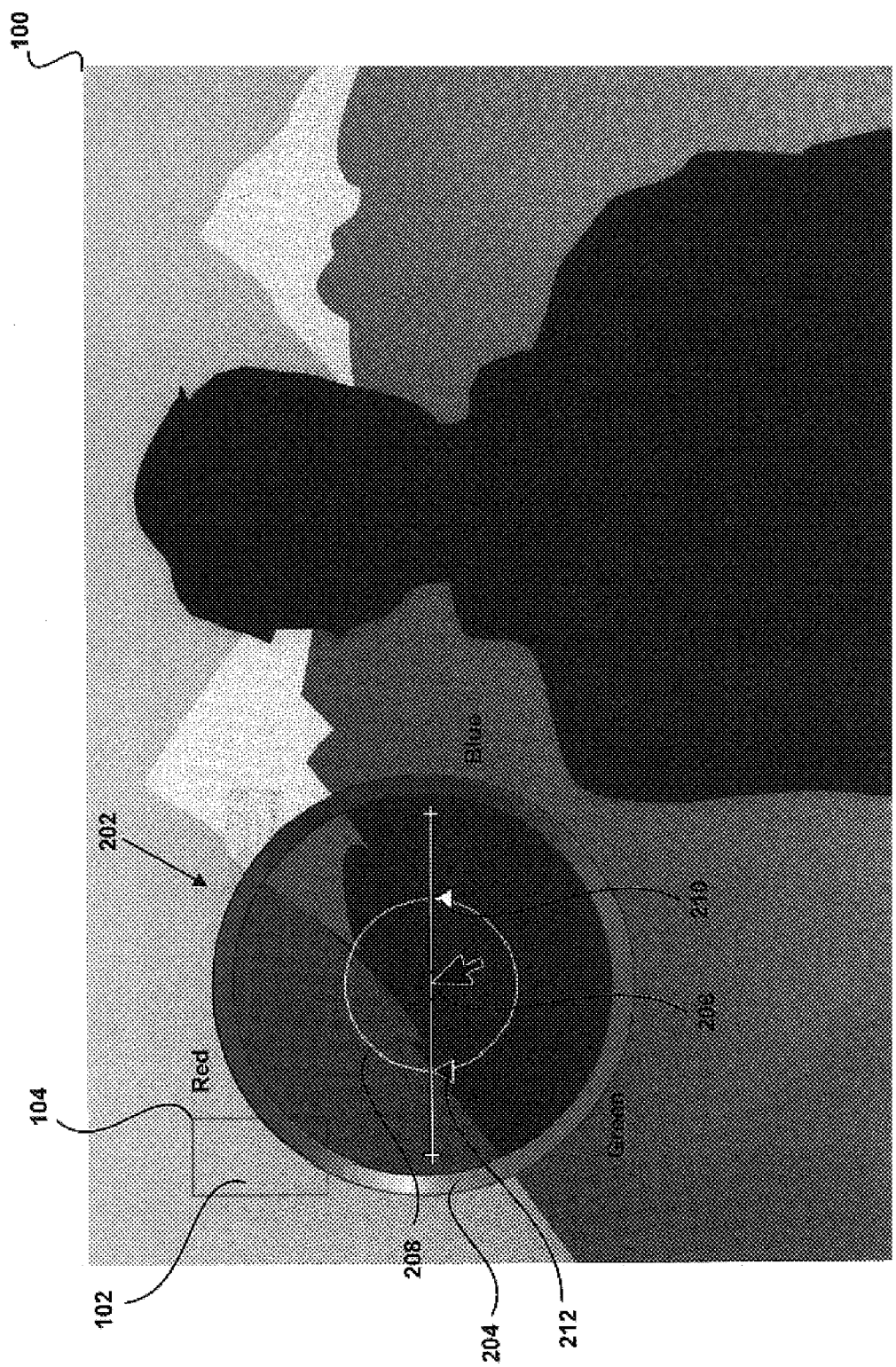
FIG. 2a illustrates an exemplary correction interface for applying color corrections to a digital image.

FIG. 2a illustrates an exemplary correction interface 202 for applying color corrections to the digital image 100 based on the region 102. Upon mouse up or in response to other user input (e.g., clicking a button or pressing a hot key), a correction interface 202 is displayed that overlies the digital image 100 and is proximate to the bounding box 104. In some implementations, the type of correction interface 202 that is displayed is determined by a range of pixel values contained in the region 102. For example, if the region 102 includes a hue range, then the correction interface 202 can include controls for adjusting hue overstep. A single correction interface 202 can include controls for controlling multiple characteristics, such as balance, levels, saturation and hue shift. The correction interface 202 can be semi-translucent to allow the user to see the digital image 100 through the correction interface 202. In contrast to conventional work flows, the correction interface 202 is displayed over the digital image 100, so that the user can stay focused on the digital image 100 while making adjustments.

In the example shown in FIG. 2a, the correction interface 202 includes a hue control 204, a balance control 206, a saturation control 208, a white level control 210 and a black level control 212 for adjusting the hue, balance, saturation and white and black levels, respectively, of one or more portions of the digital image 100. In this particular implementation, the correction controls are displayed as geometric shapes. The hue control 204 is a wheel, the balance control 206 is a diamond, the saturation control 208 is a white circle, the white level control 210 is a white triangle, and the black level control 212 is a black triangle. Other correction controls are possible (e.g., sliders, buttons, histograms (2D or 3D), editable curves, dials, dialog panes, etc.).

A user can color correct one or more portions of the digital image 100 based on a range of pixel values in the region 102 by clicking and dragging or otherwise moving one or more of the correction controls within the correction interface 202. For example, the user can adjust color balance by clicking on the balance control 206 with a mouse or other pointing device and dragging the balance control 206 towards the desired hue on the hue wheel 202 (e.g., towards the blue portion of the hue wheel to add more blue). Other controls can be similarly manipulated as desired to achieve the desired corrections to the digital image 100 based on the range of pixel values in the region 102. In some implementations, only the controls manipulated by the user are visible in the correction interface 202. For example, if the user were adjusting the balance, the levels and saturation controls would fade out and allow the user to focus on the image, thus reducing visual clutter.

Hue Shift

Figure 2B:
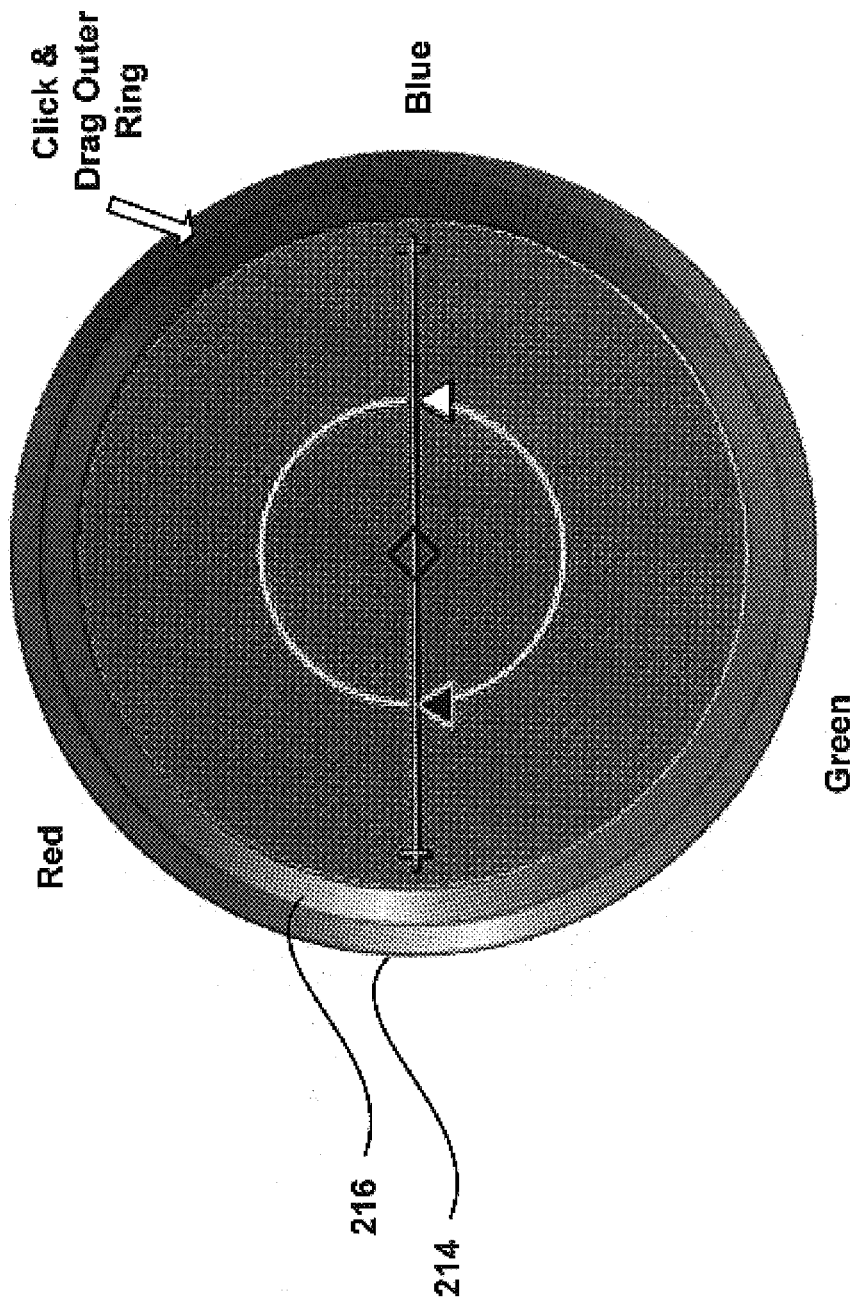
FIG. 2b illustrates an exemplary correction interface including hue shift capability.

FIG. 2b illustrates an exemplary correction interface 213 for hue shifting. The color correction interface includes an outer hue wheel 214 and an inner hue wheel 216. In some implementations, the inner hue wheel 216 represents input colors and the outer hue wheel 214 represents output colors. As one traverses clockwise either the outer hue wheel 214 or the inner hue wheel 216, the color ranges in the hue wheels, 214, 216, gradually transition from a red range to a blue range, then to a green range. Similarly, as one traverses counter-clockwise either the outer hue wheel 214 or the inner hue wheel 216, the color ranges in the hue wheels 214, 216, gradually transition from a red range, to a green range, then to a blue range. The saturation or richness of a color increases as one moves from the center of the hue wheels 214, 216, towards the rings. At the center of the hue wheels 214, 216, the saturation is lowest (e.g., gray tones). In some implementations, a user can make a color adjustment by clicking on the outer hue wheel 214 and dragging it so that it rotates clockwise or counterclockwise relative to the inner hue wheel 216. Colors in the image associated with the inner hue wheel 216 will be replaced with colors in the outer hue wheel 214 that match-up with the inner hue wheel 216 colors due to rotation of the outer hue wheel 214. In other implementations, the outer hue wheel 214 represents the input colors and the inner hue wheel 216 represents the output colors and both wheels can be rotated relative to each other.

Improved Color Correction Workflow

Figure 3:
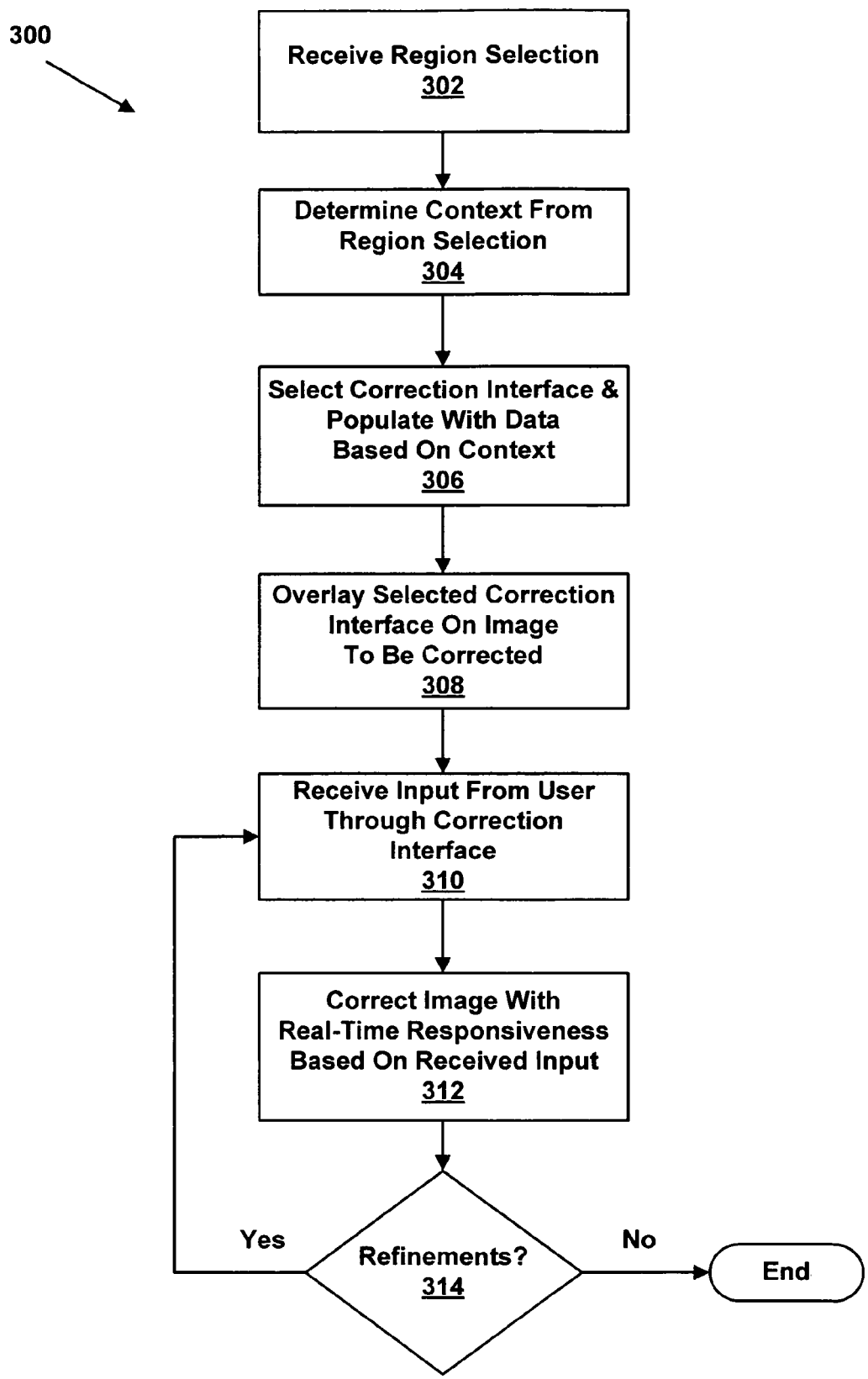
FIG. 3 is a flow diagram of an exemplary color correction workflow.

FIG. 3 is a flow diagram of an exemplary color correction workflow 300. The process 300 can be implemented in a multi-threading or multi-processing environment, and at least some of the steps of the process 300 can occur in parallel or in a different order than shown. The process 300 begins when a region is selected by a user (302). The user can select a region using, for example, a bounding box and visual cues, as described with respect to FIG. 1. After a region is selected, the process 300 determines a context from a range of pixel values in the selected region (304). When a region is selected it can be interpreted by, for example, a heuristic engine, to determine the image characteristic the user intends to correct. In some implementations, a heuristic engine can be used to interpret the user's intended correction based on data collected from expert level colorists. For example, if the selected region contains shadows, then it is likely that the user intended to adjust luminance. Similarly, if the selected region includes a range of hue that spreads out in a range of luminance, then it is likely that the user intended to make a hue-based selection.

After the correction context is determined, the process 300 selects an appropriate correction interface and populates the interface with data based on the context (306). For example, the process 300 can generate a set of curves with appropriate limits based on the user's initial region selection. Examples of selected ranges can include a luminance range, a hue range, a saturation range, one or more chrominance-luminance bounding regions, etc. After the correction interface is selected it is overlaid on the digital image to be corrected (308). In some implementations, the correction interface is semi-translucent to enable the user to see the digital image beneath the correction interface while making color adjustments. A correction interface can include any number and types of correction controls, including but not limited to: wheels, sliders, buttons, dials, histograms (2D or 3D), editable curves, dialog pane, etc. The process 300 receives input through the correction interface (310) and corrects the digital image based on the input (312). The correction can be initiated by the user clicking on a correction button or other input mechanism in the correction interface or the digital image, or by pressing a key or key combination on a keyboard or other input device.

Figure 8C:
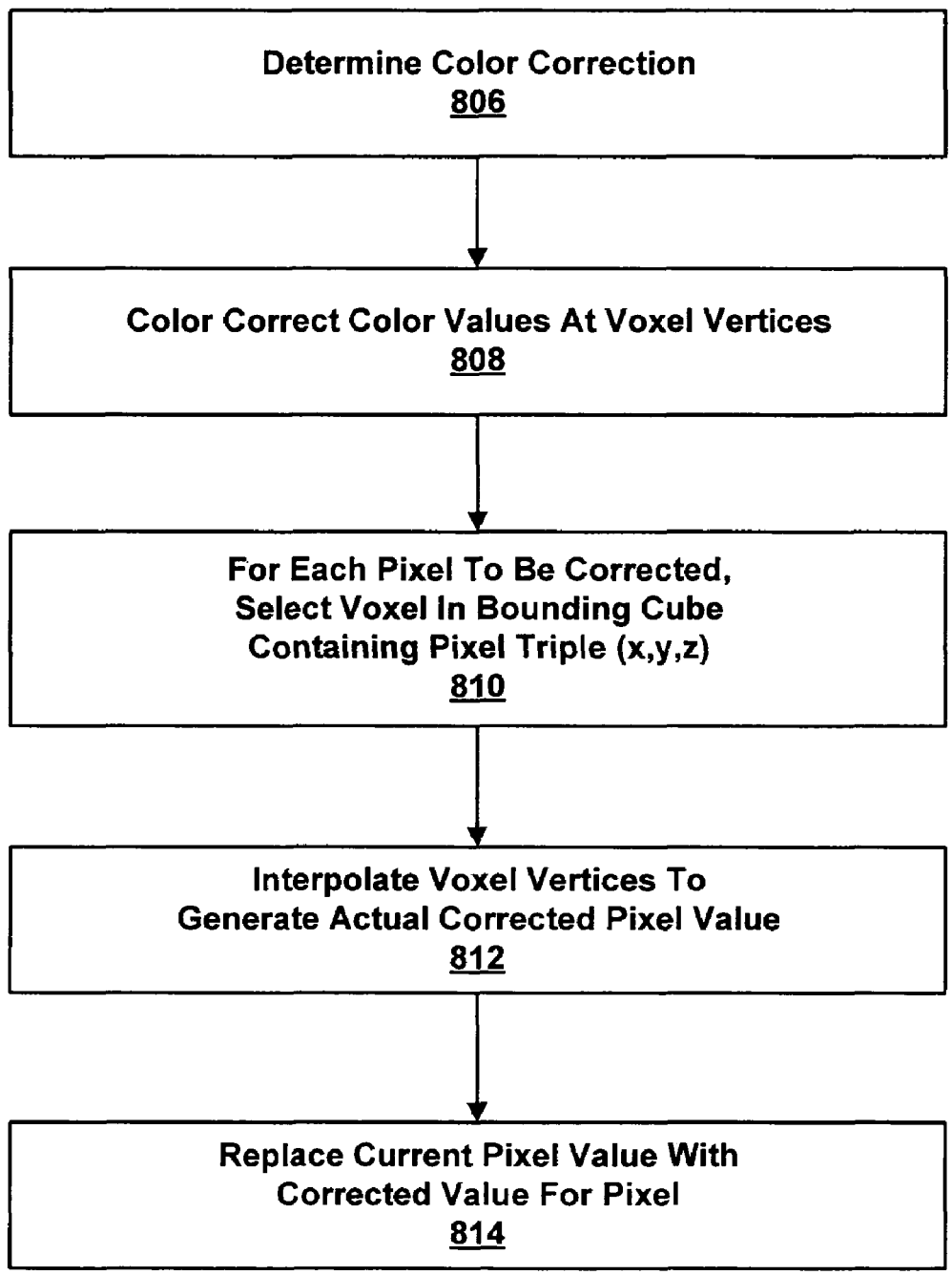
FIG. 8c is a flow diagram of an exemplary 3D LUT color correction process.

In some implementations, corrections are made with real-time responsiveness by using a 3D Look-up Table (LUT) for color correction, as described with respect to FIGS. 8a and 8b. Real-time responsiveness enables users to see their adjustments to the digital image immediately. If the user needs to refine their adjustments (314), they simply adjust the appropriate controls in the correction interface (which remains overlaid on the digital image) and the image is immediately adjusted with real-time responsiveness. This correction and refinement cycle continues until the user is satisfied with their corrections.

The correction interface 202 is well-suited for coarse level color adjustments. In some circumstances, however, the user needs more precise controls to define/refine the selection and the correction. Such precise controls may include editable curves for luminance, hue and saturation, or other user interface elements for entering precise values (e.g., a dialog pane). These refined controls can be accessed by the user using the workflows described with respect to FIGS. 1-3, together with the features described with respect to FIGS. 4a-4i.

Workflows for Selection Adjustment Operations

Figure 4A:
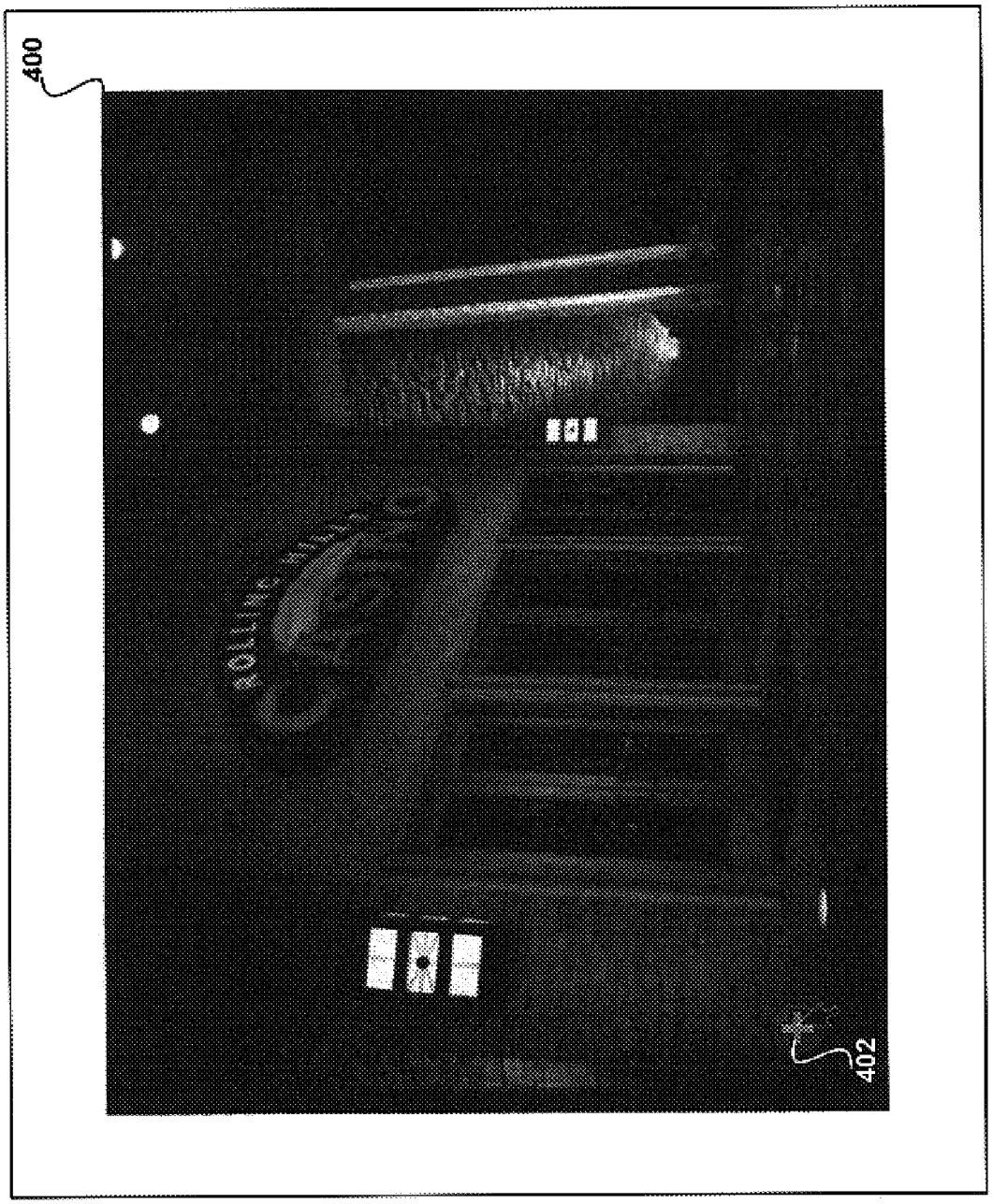
Figure 4B:
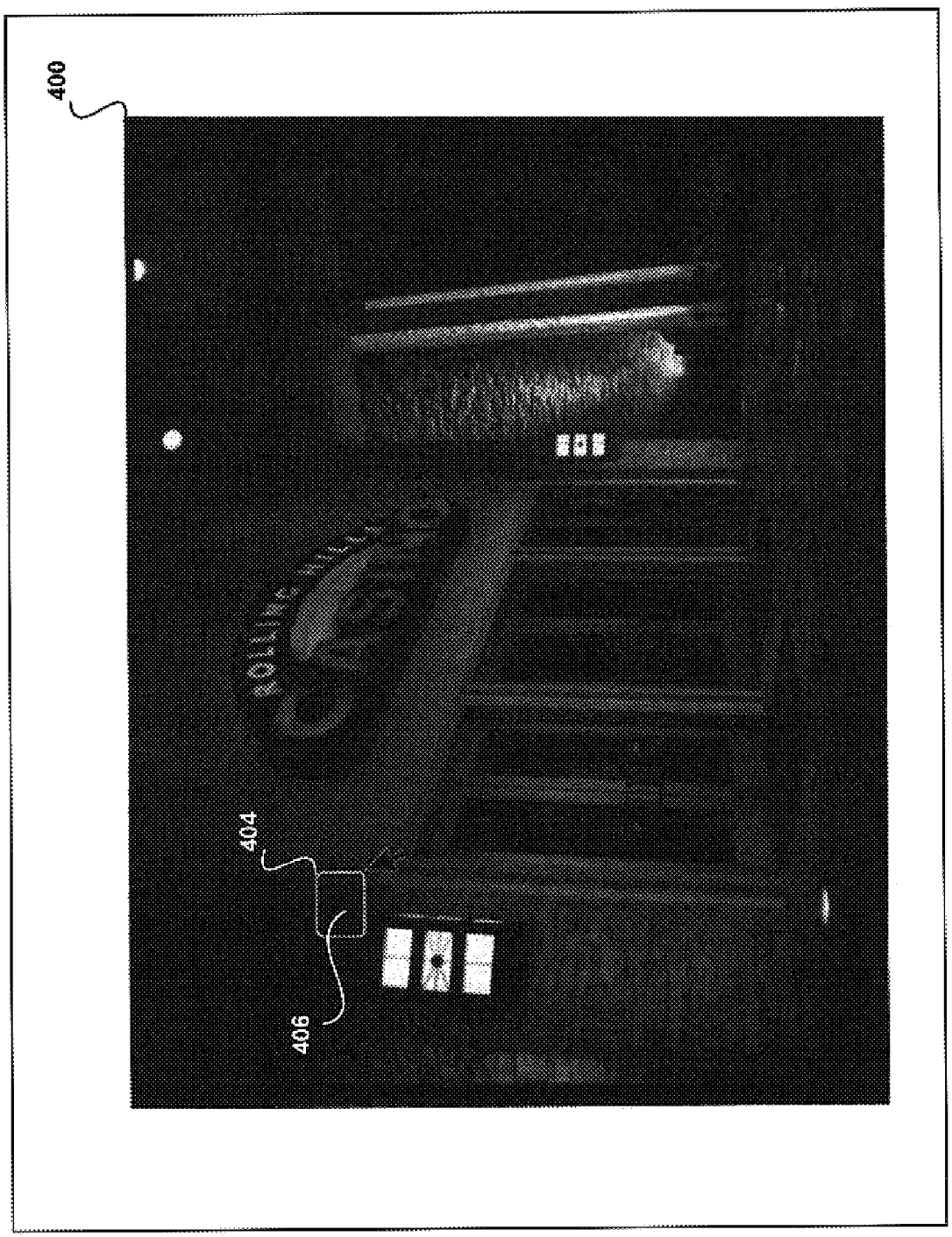

FIGS. 4a-4i are screenshots illustrating exemplary workflows for adjusting the colors falling in a range of luminance and a range of hue of a digital image 400 using a selected range. Referring to FIG. 4a, in some implementations the user clicks (or performs a mouse over) on a hot spot 402 located in the lower left hand corner of the digital image 400 to initiate a region selection mode (e.g., a color range selection mode). Other locations for the hotspot are possible. Other user interface elements and input mechanisms can be used to enter the region selection mode, such as pressing a hot key or key combination on a keyboard. As shown in FIG. 4b, when the region selection mode is entered, the user can use a cursor or other pointing device to drag out a bounding box 404 over a region 406 to capture a range of pixel values, which will be used in the color correction process. In the example shown, the user is selecting a region 406 containing shadows.

Figure 4C:
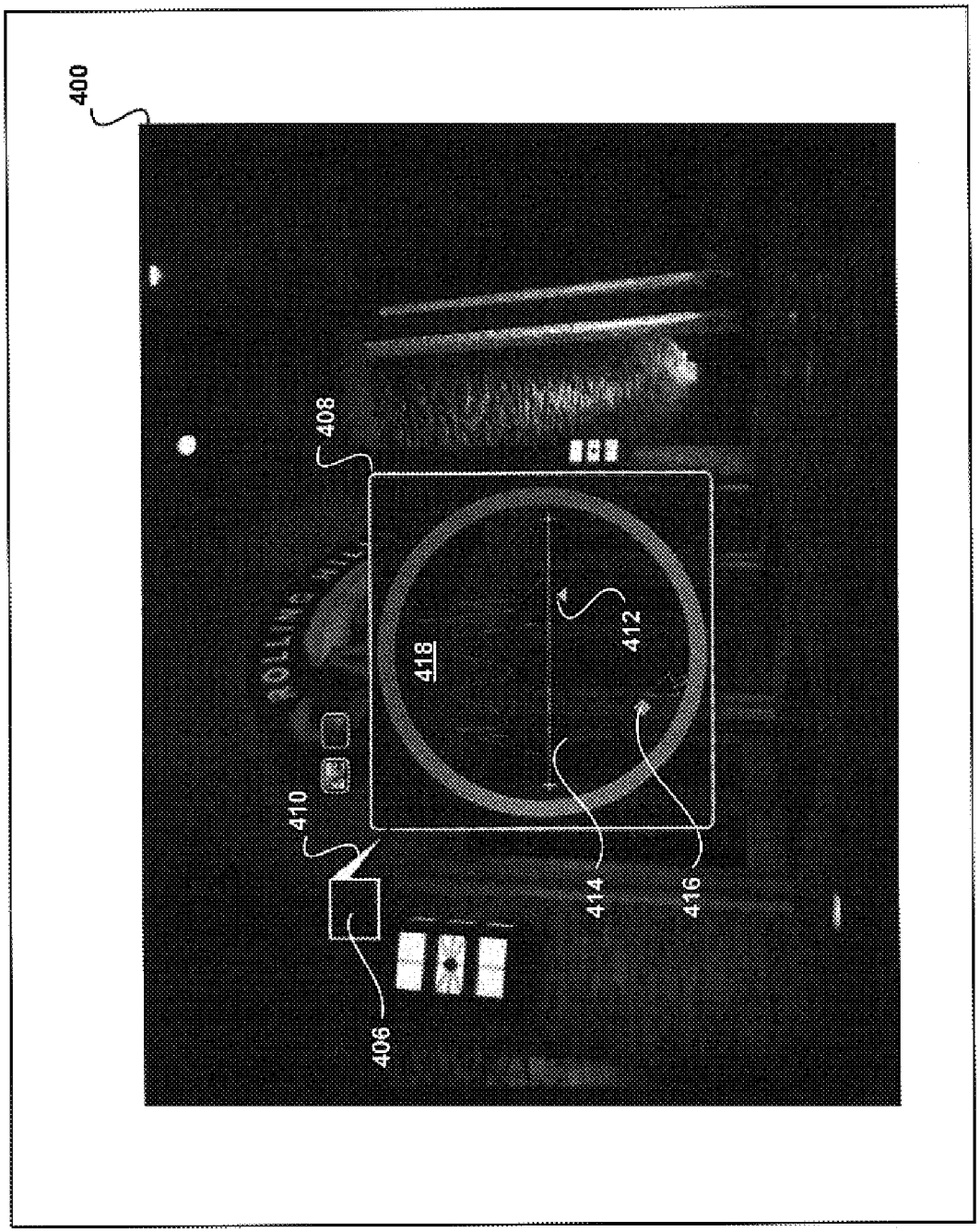

Referring to FIG. 4c, when the user releases the mouse or otherwise terminates the region selection mode, a correction interface 408 is displayed over the digital image 400 and the region 406 is bounded by a selection tag 410 to show the currently active selection sample. For example, the user can adjust white and black levels and balance using controls 412, 414 and 416, respectively. In some implementations, a luminance histogram 418 is displayed within the correction interface 408 to provide the user with a luminance histogram of the entire image. The user can drag the controls 412, 414 and 416 within the correction interface 408 to adjust the digital image 400, as shown in FIG. 4d.

Figure 4D:
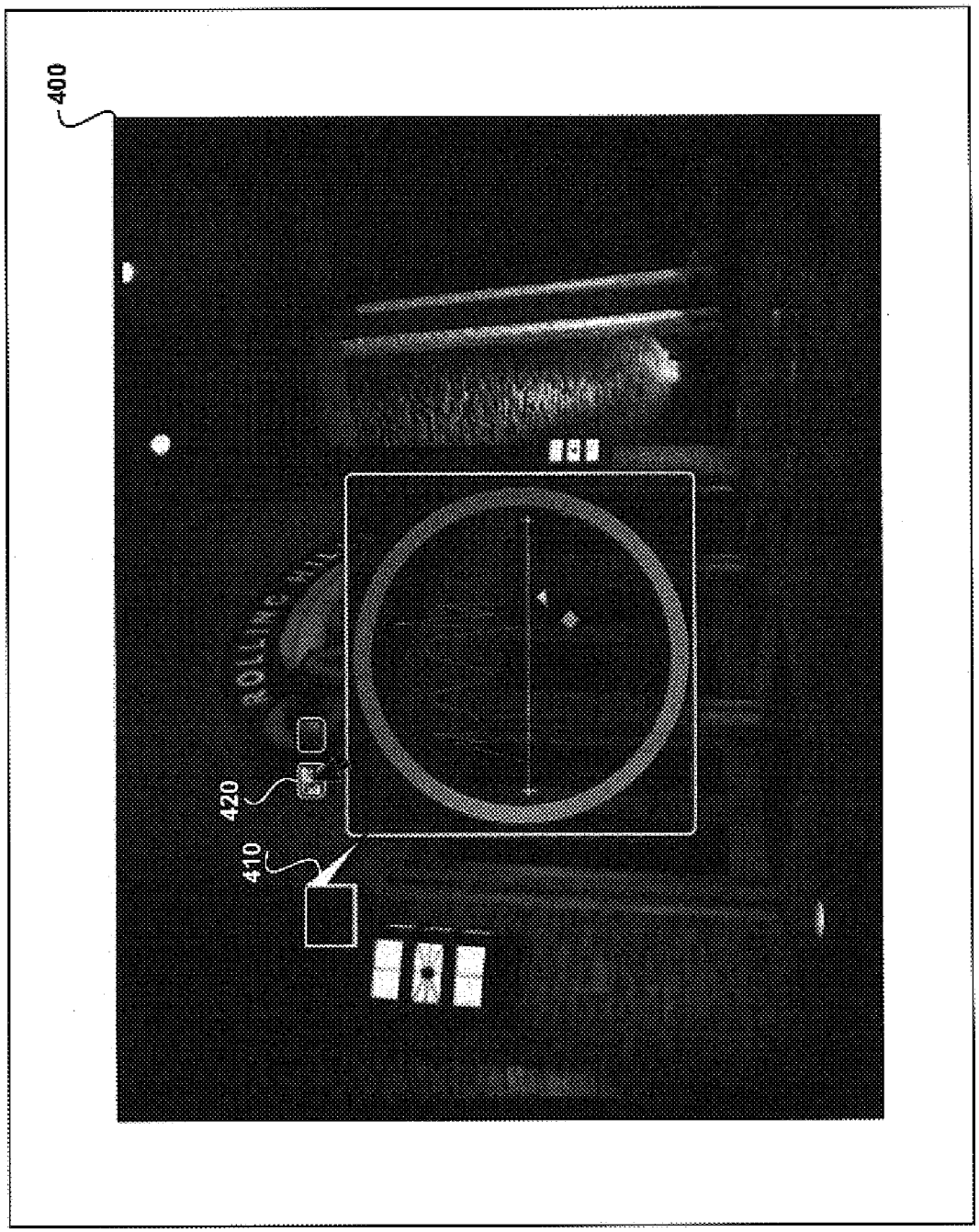
Figure 4E:
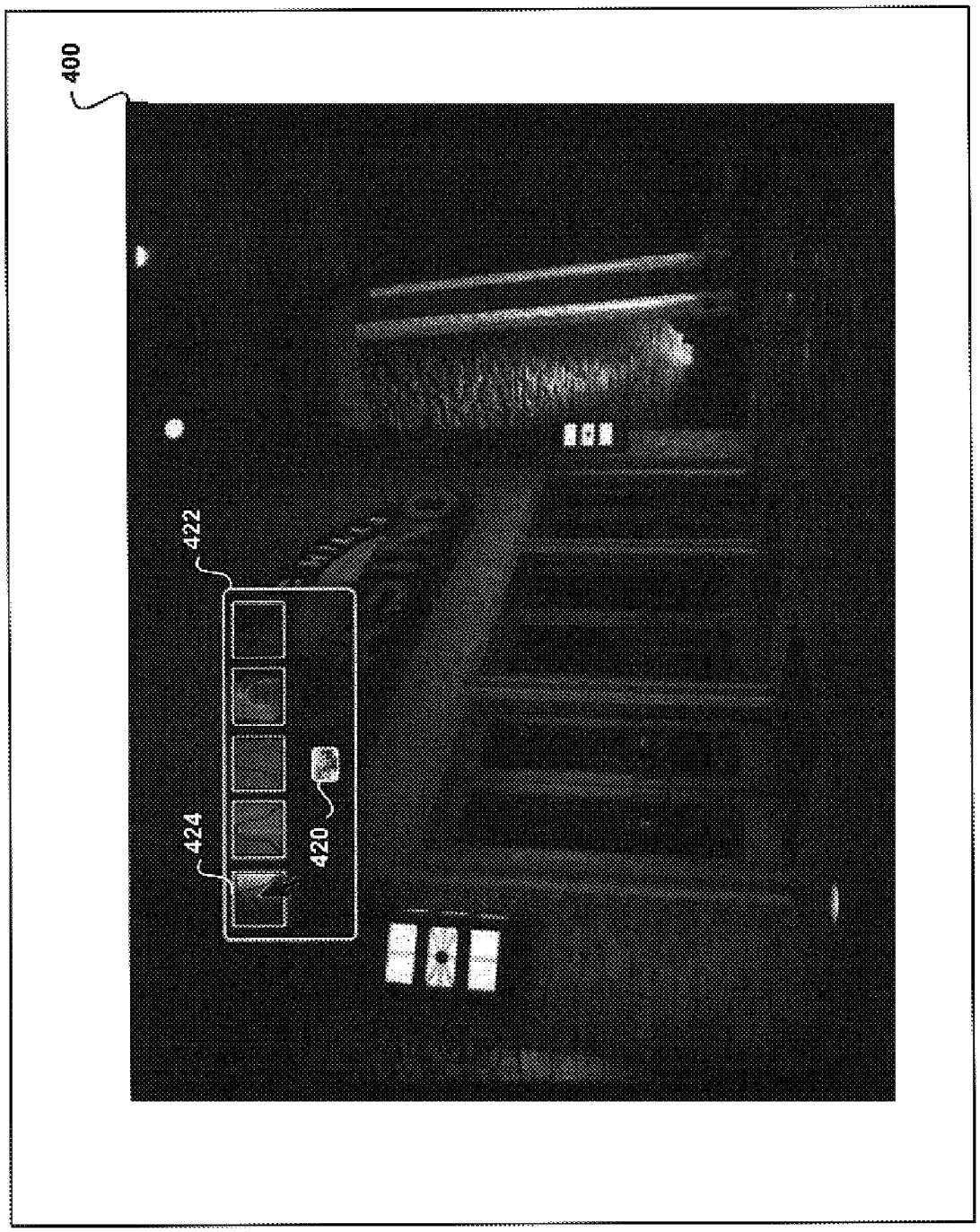

In some implementations, a selection navigator button 420 can be clicked to invoke a selection navigation pane 422, as shown in FIGS. 4d and 4e. The selection navigator button 420 is displayed in the navigation pane 422 and can be used to deactivate the selection navigation pane 422 (e.g., close the navigation pane 422). The selection navigation pane 422 includes one or more icons representing various selection modes, including but not limited to: luminance, hue, saturation and keyer selection modes. For example, the luminance range selection mode could be used to enable a user to adjust a specific range of shadows in the digital image 400 without affecting satisfactory black levels in the digital image 400. The hue range selection mode could be used to enable a user to selectively de-saturate a specific color in the digital image 400 without affecting similar colors in the digital image 400. The saturation range selection mode could be used to allow a user to selectively saturate colors that are not too saturated because saturating a color that is too saturated can force the color outside the color gamut. The keyer selection mode enables a user to select a specific color on the digital image 400 (e.g., a blue shirt) without selecting a similar blue in other objects on the digital image 400 (e.g., a blue sky, or the blue eyes of a person, etc.). The keyer mode allows a user to select multiple regions, and provides a visual indicator (e.g., a bounding box, selection tag, etc.) for each selected region in the digital image 400.

Figure 4F:
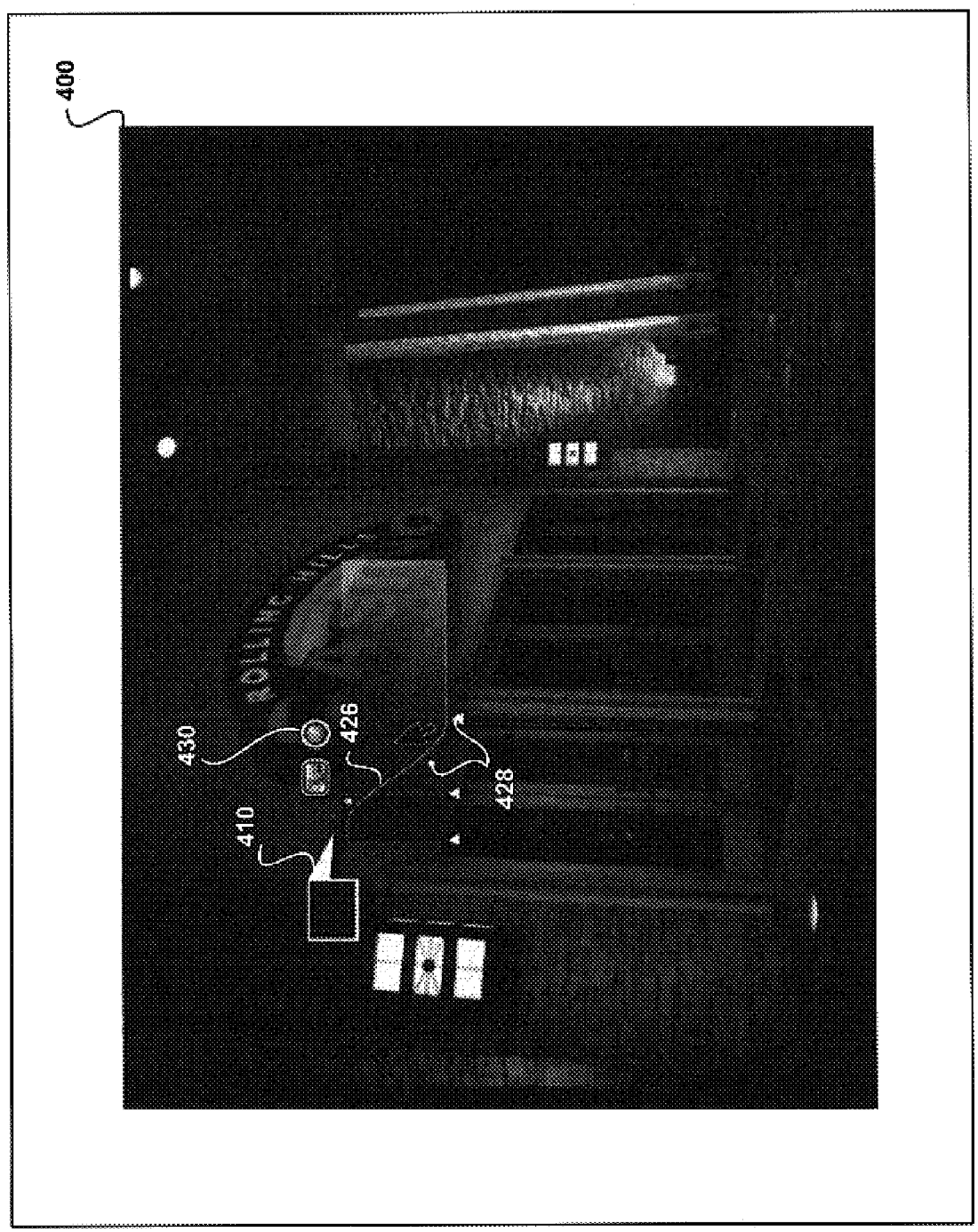

In some implementations, some or all of the selection modes display an editable curve or other refinement tool (e.g., a slider, dialog pane, etc.) for refining the selection range. For example, if the user selects the luminance icon 424, then an editable luminance curve 426 is displayed, as shown in FIG. 4f. The user can edit the luminance curve 426 by clicking on and dragging one or more of the handles 428 proximate the luminance curve 426. The user can return to the correction interface 408 by clicking a toggle button 430. Note that the selection tag 410 remains visible to remind the user of the currently active selection sample. This is helpful when multiple selection samples have been created by the user, such as shown in FIG. 4g.

An important feature of the color correction and selection refinement workflow shown in FIG. 4f is the automatic selection and display of an appropriate refinement tool based on the currently active selection sample. For example, since the selection sample in region 406 contained shadows, the luminance range selection mode was automatically invoked and an editable curve 426 for adjusting luminance was displayed. Moreover, the editable curve 426 was populated with data based on the selection sample. In some implementations, the selection mode can be automatically determined using a heuristic engine with data from expert level colorists. This feature provides significant advantages over conventional color correction workflows by automatically selecting a refinement tool based on the user's initial selection sample, thus saving the user the additional step of selecting the appropriate tool from a menu or other user interface element and selecting an appropriate data range for the tool.

Another advantage of the improved workflow is the ability to work with multiple selection samples at the same time without losing context. In FIG. 4g, the user selects a new region 434 using a bounding box 432. Note that the previous region 406 and bounding box 404 remain visible on the digital image 400 to remind the user of the location of the previous selection sample. At any time in the workflow the user can make adjustments to the digital image 400 based on the previous selection sample in region 406 by clicking or rolling over the region 406 with a cursor or other pointing device, or by pressing a hot key or key combination, etc.

Figure 4H:

Upon mouse up or other user input, a selection tag 436 is displayed, together with an editable curve 438 having a default range that is based on the range of the selection sample, as shown in FIG. 4h. In this example, the selection sample included a range of colored pixels (e.g., yellow). Based on the selection sample, a hue range selection mode was automatically determined and the appropriate editable curve 438 for adjusting hue was displayed and populated with data.

Figure 4I:
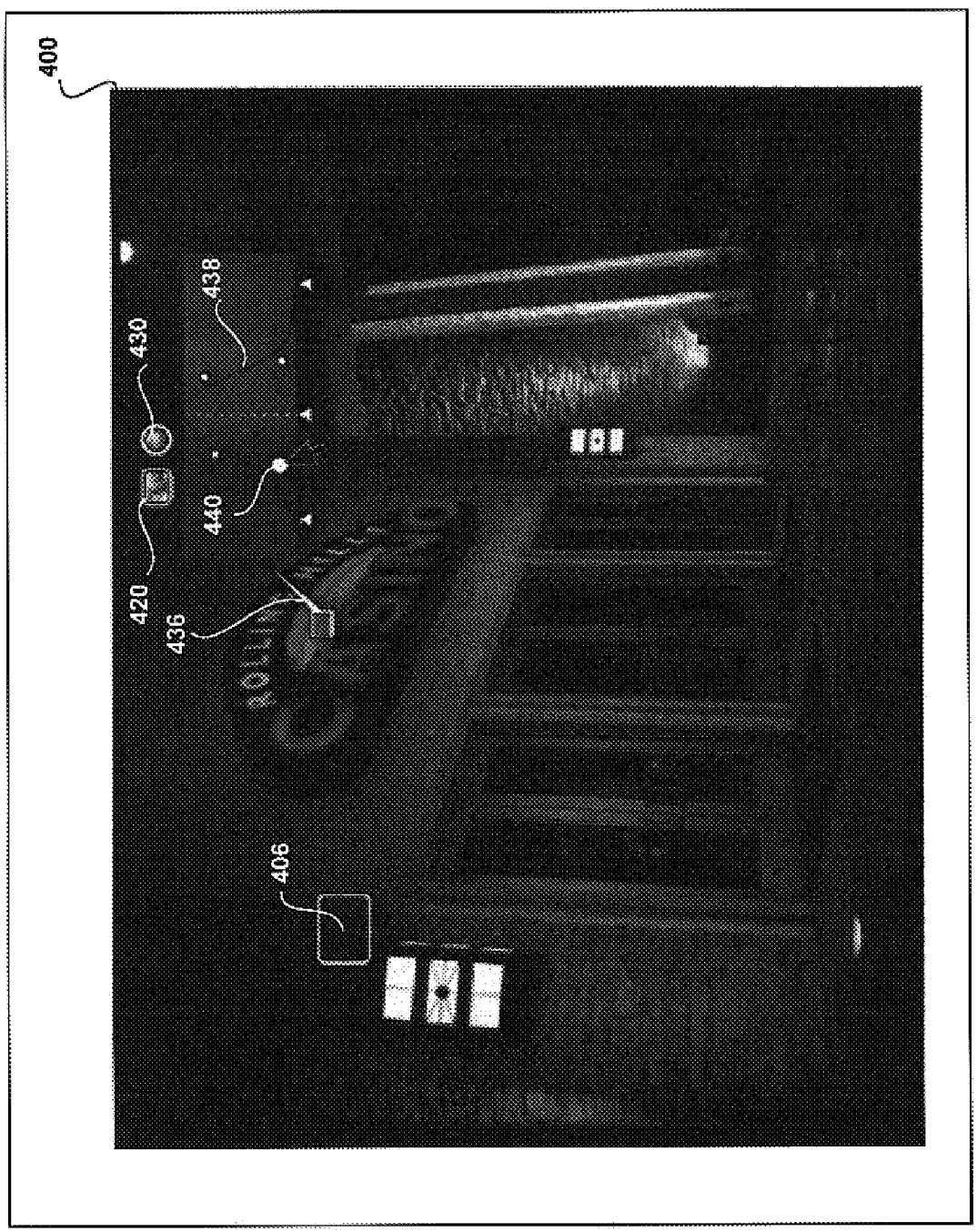

FIG. 4i shows the user adjusting the editable hue curve 438 by clicking and dragging a handle 440. When the user finishes adjusting the hue curve, the user can toggle back to the correction interface 408 by clicking the toggle button 430. Alternatively, the user can click the navigation selection button 420 to invoke the selection navigation pane 422 to select another selection mode.

Workflows for Exposure Operations

Figure 5A:
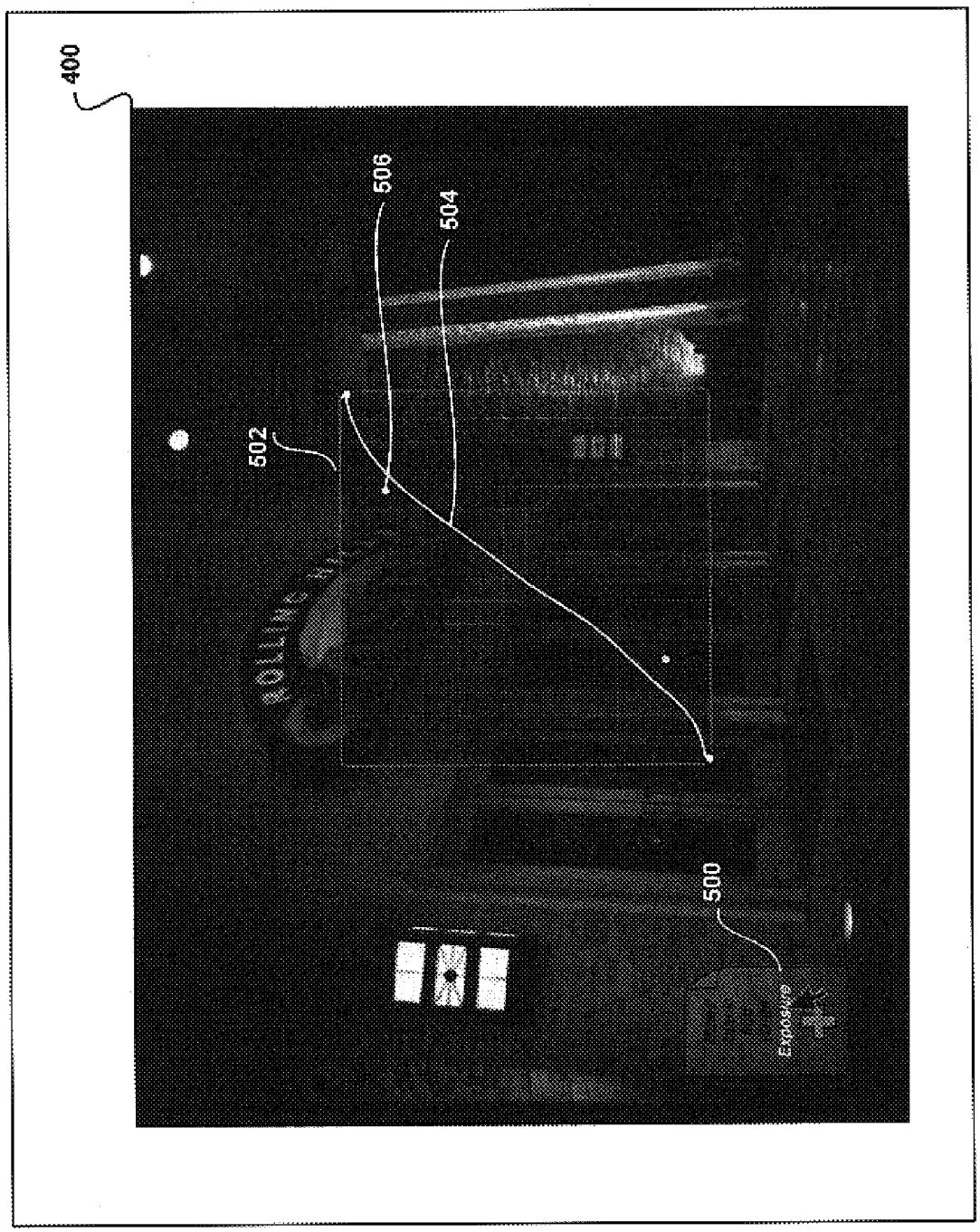
FIGS. 5a-5c are screenshots illustrating exemplary workflows for adjusting the exposure of a digital image.
Figure 5B:
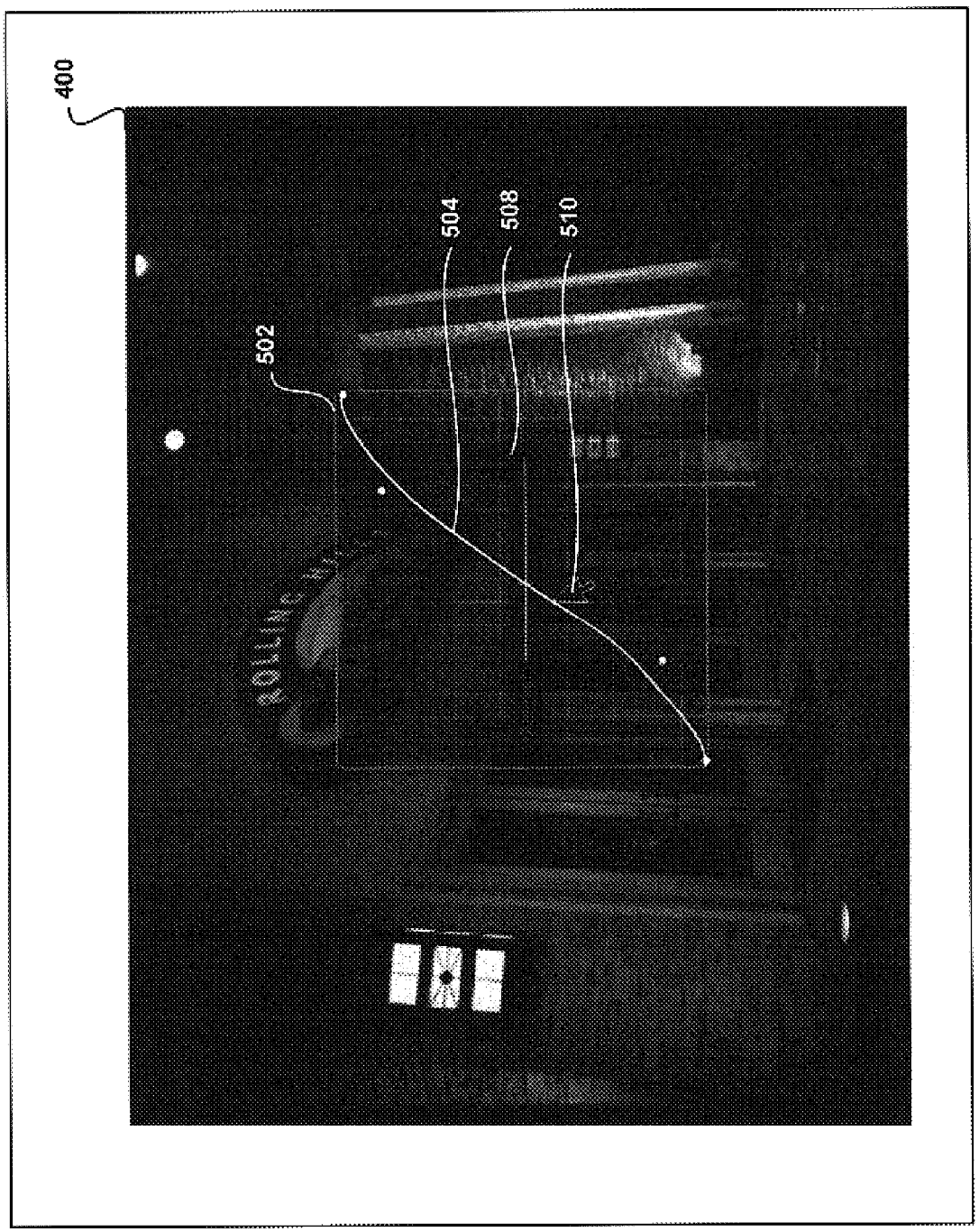
Figure 5C:
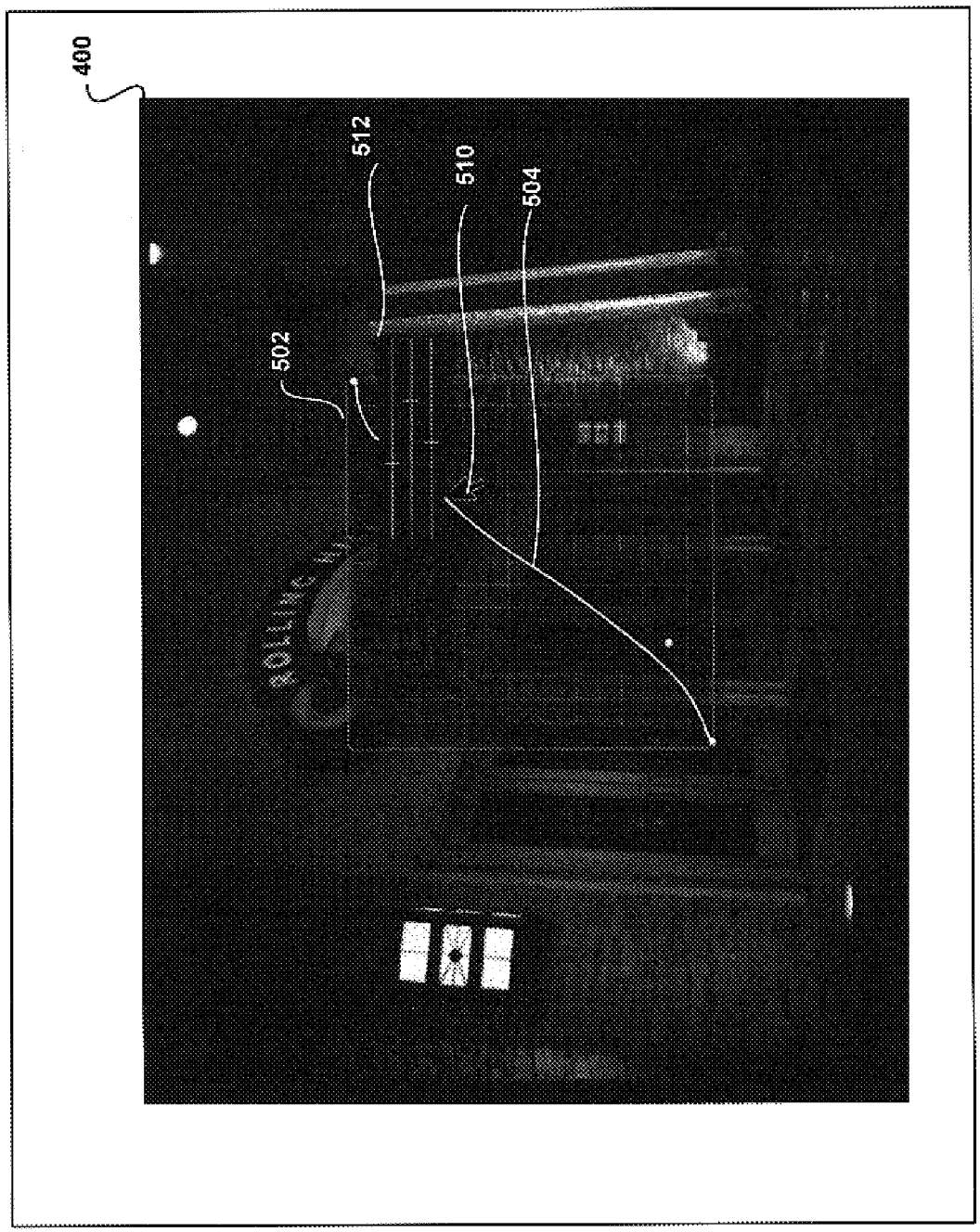

FIGS. 5a-5c are screenshots illustrating exemplary workflows for performing exposure operations on a digital image 400. Referring to FIG. 5a, in some implementations the user selects an exposure option from a menu 500 or other user interface element (e.g., a button, dial, ext.). The menu 500 can be presented in response to a mouse click or mouse roll over. The menu 500 can be made semi-translucent so as not to obscure the digital image 400.

In response to selecting the exposure option, a correction interface 502 is displayed over the digital image 400. The correction interface 502 can be semi-translucent so as not to obscure the digital image 400. The correction interface 502 includes an editable exposure curve 504 derived from the pixels of the digital image 400. The user can adjust the exposure curve 504 by clicking and dragging a handle 506 to adjust the shape of the exposure curve 504 as desired. The digital image 400 is adjusted while the user is making the adjustments, providing real-time responsiveness. In some implementations, the real-time responsiveness is provided by a 3D LUT, as described with respect to FIGS. 8a and 8b.

An important aspect of the workflows described above is the determination of appropriate refinement controls based on context. Referring to the example shown in FIG. 5b, if the user moves the cursor 510 to the middle part of the exposure curve 504, then a contrast control 508 is displayed for adjusting contrast. The control 508 shown in FIG. 5b is a slider but other user interface elements are possible (e.g., button, dials, dialog pane, etc.). If the user desires to adjust the middle portion of the exposure curve 504, then the user is likely to be adjusting contrast. Similarly, if the user moves the cursor 510 further up the exposure curve 504, then a different set of controls 512 are displayed, as shown in FIG. 5c. The controls 512 can be used to adjust white gamma, white limiter and chroma limiter, which are typical adjustments to make to the upper portion of the exposure curve 504.

Thus, like the luminance and hue range adjustments previously described with respect to FIGS. 4a-i, the user is automatically provided with a set of appropriate controls for adjusting the exposure of the digital image 400 based on the portion of the exposure curve 504 the user is attempting to adjust. The position of the cursor 510 along the exposure curve 504 can be used to determine the appropriate controls to display.

Color Matching

FIGS. 6a-6e are screenshots illustrating exemplary workflows for color matching between digital images. In some implementations, the user selects a color matching option from a menu 600 or other user interface element. The menu 600 can be presented in response to a mouse click or mouse roll over. The menu 600 can be made semi-translucent so as not to obscure the digital image 400. Other input mechanisms are possible.

In color matching mode the user selects a target image 602 for color matching with a reference digital image 400. The target digital image 602 can be retrieved in response to a menu selection, a search request or any other selection mechanism (e.g., displayed in separate viewers or different display devices, etc.). In some implementations, the digital images 400 and 602 are automatically placed side-by-side on the screen of the user's display device. In other implementations, the digital images 400 and 602 can be placed anywhere on the screen and can be resized and moved around as desired.

Figure 6A:
FIGS. 6a-6e are screenshots illustrating exemplary workflows for color matching two digital images.
Figure 6B:
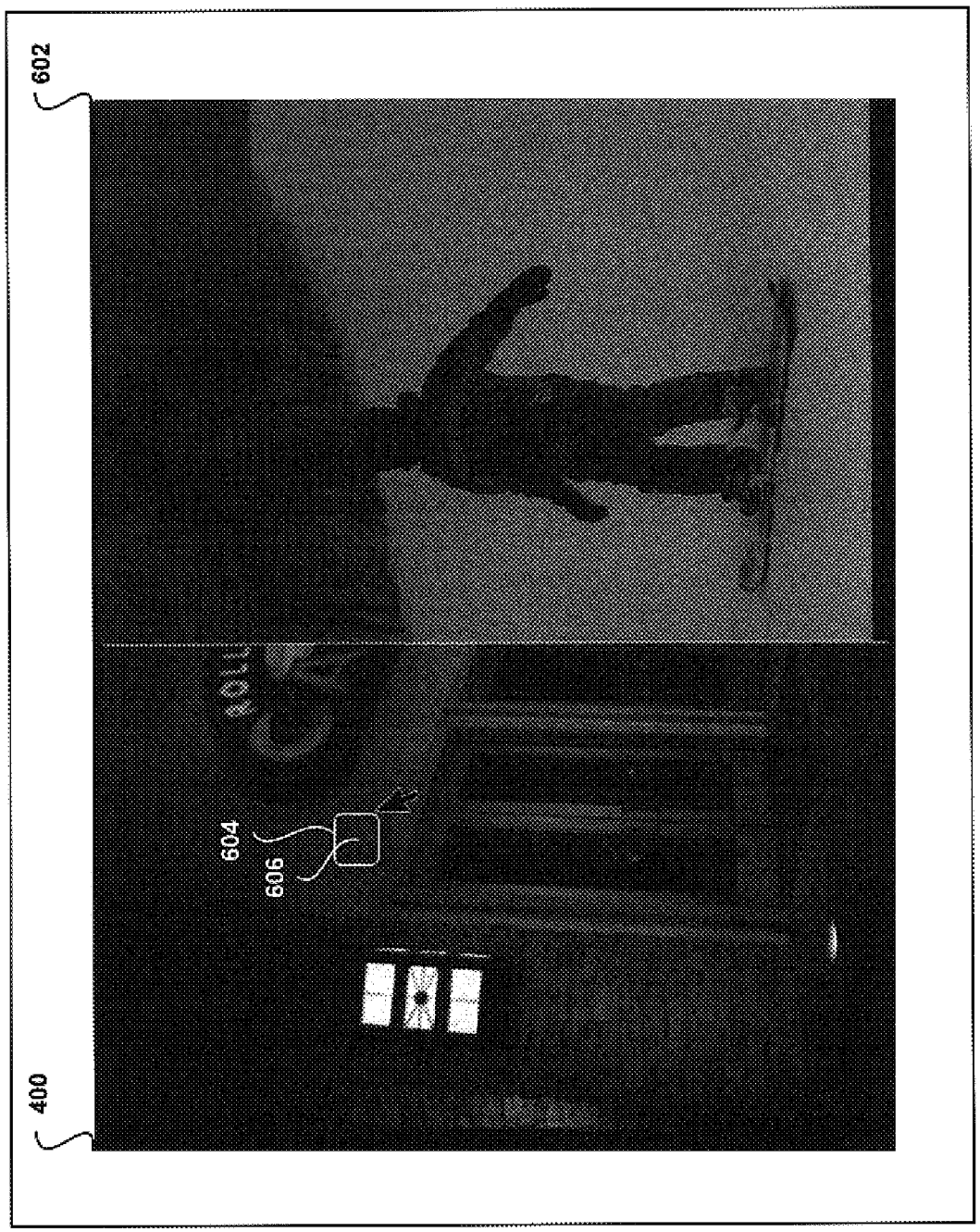

To color match selected portions of the digital images 400 and 602, the user selects a color region 606 in the digital image 400 using a bounding box 604, as shown in FIG. 6b. Although a bounding box 604 is shown as the selection tool, any suitable selection tool can be used to select a color region in the digital image 400 (e.g., a spline). The bounding box 604 can be visually altered (e.g., glowing, different color, selection tag, etc.) to indicate that the region 606 is currently active.

Figure 6C:
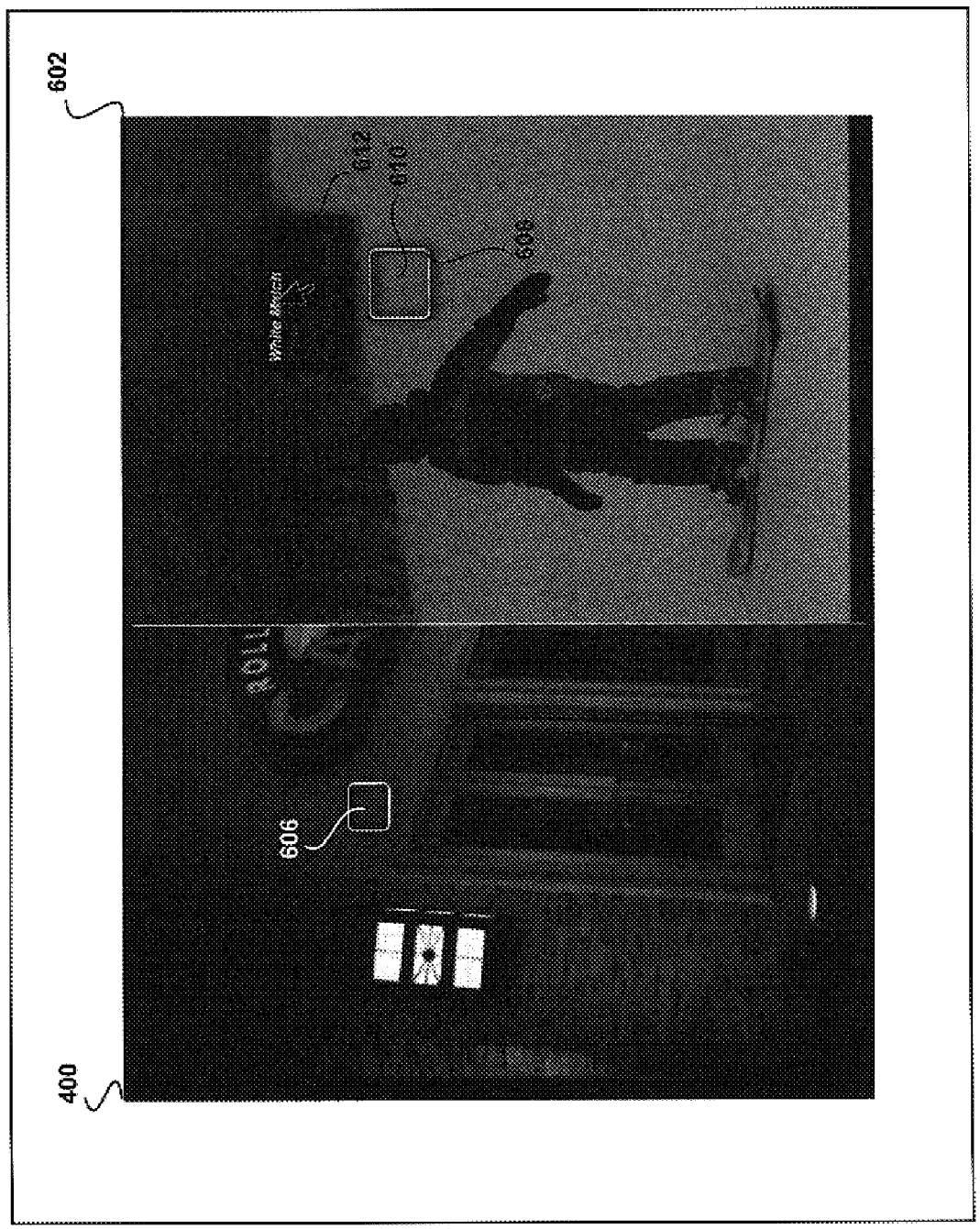

Next, the user selects a color region 610 from the digital image 602 using a bounding box 608, as shown in FIG. 6c. Upon mouse up or other user input (e.g., a hot key or key combination), a menu 612 is displayed in the digital image 602. The menu 612 includes several options for color matching, including but not limited to: white matching, black matching, saturation matching, hue range matching, etc. Other color matching options are possible. Upon selection of color matching option from the menu 612, pixels in the target digital image 602 having a color in the selected color range 610 are transformed or replaced with a corresponding color in the selected color range 606. In some implementations, the options displayed in the menu 612 can be determined based on the range of pixel values contained in the selected regions 606 and 610. The user can manually select the type of matching they desire from the menu 612. Alternatively, the type of matching can be selected programmatically based on the range of pixel values in the regions 606 and 610. For example, if the regions 606 and 610 contain many white or light pixels, then white matching is automatically selected. If the regions 606 and 610 contain many black or dark pixels, then black matching is automatically selected.

Figure 6D:
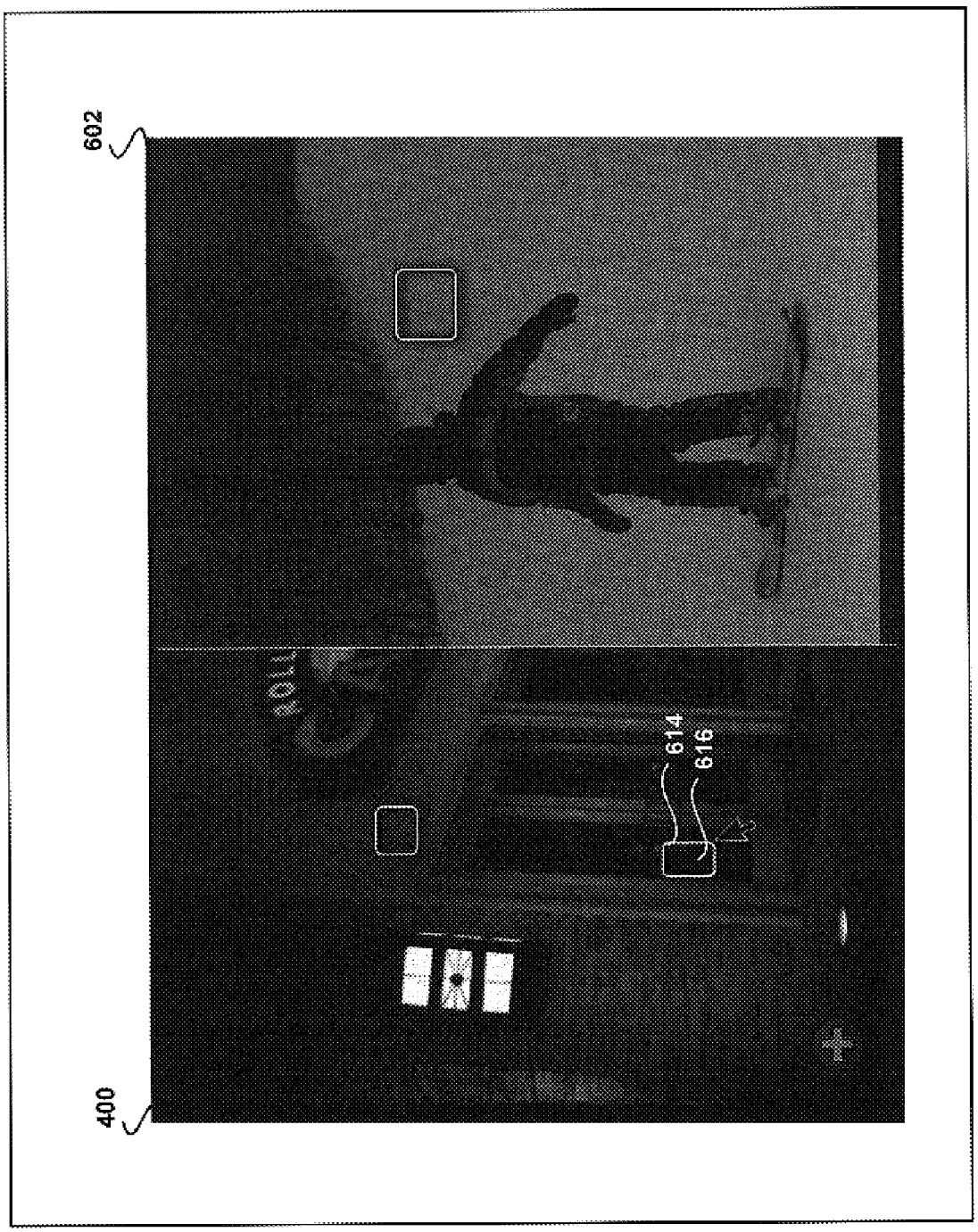
Figure 6E:
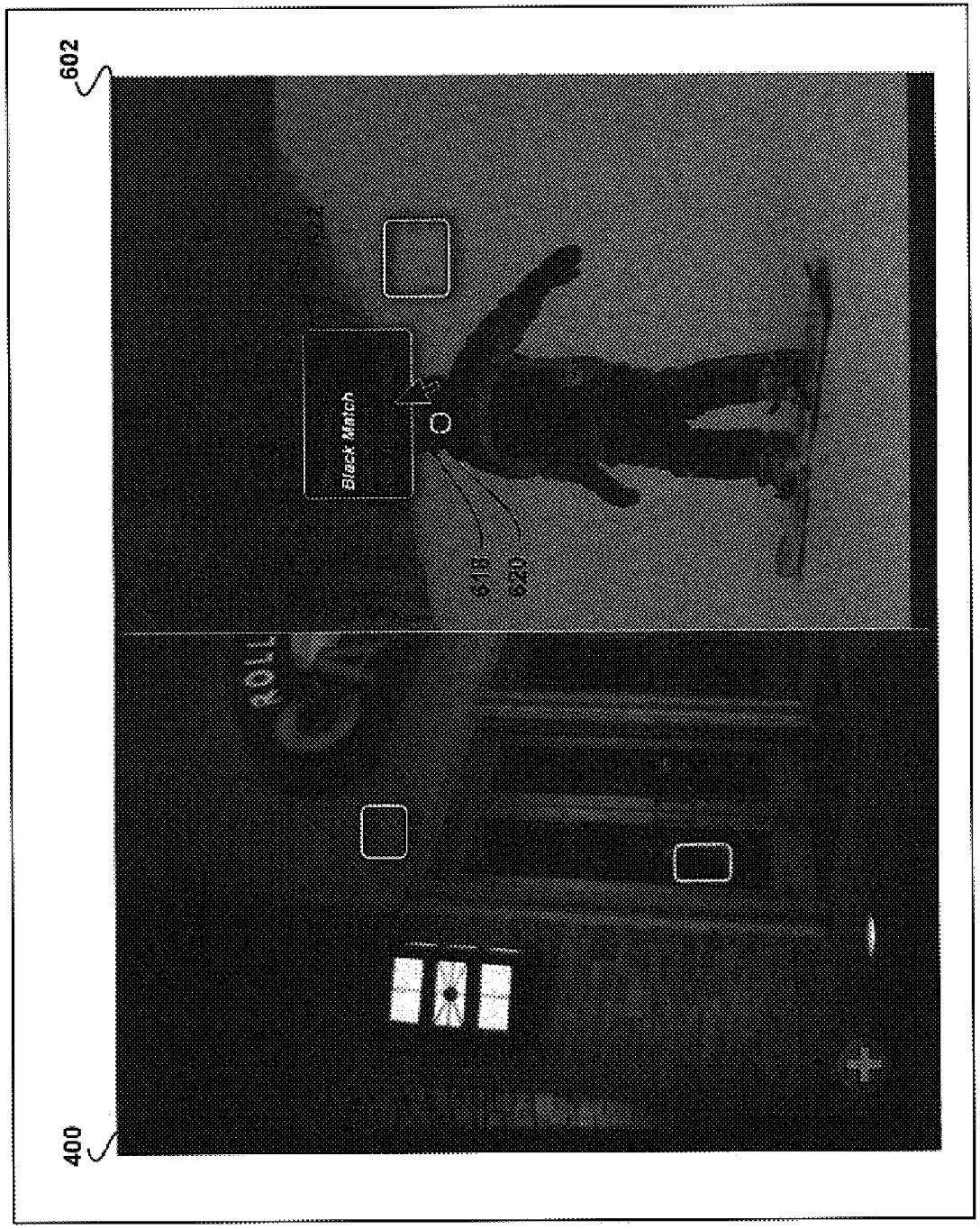

FIGS. 6d and 6e illustrate a black level matching operation. The user selects a region 616 in the digital image 400 using a bounding box 614 and then selects a region 620 in the digital image 602 using a bounding box 618. A menu 622 is displayed in the digital image 602 which allows the user to manually select the type of matching they desire. Alternatively, the type of matching can be selected programmatically based on the range of pixel values in the regions 616 and 620. The color matching can be performed using a 3D LUT, as described with respect to FIGS. 8a and 8b.

Workflows for Masking Operations

Figure 7A:
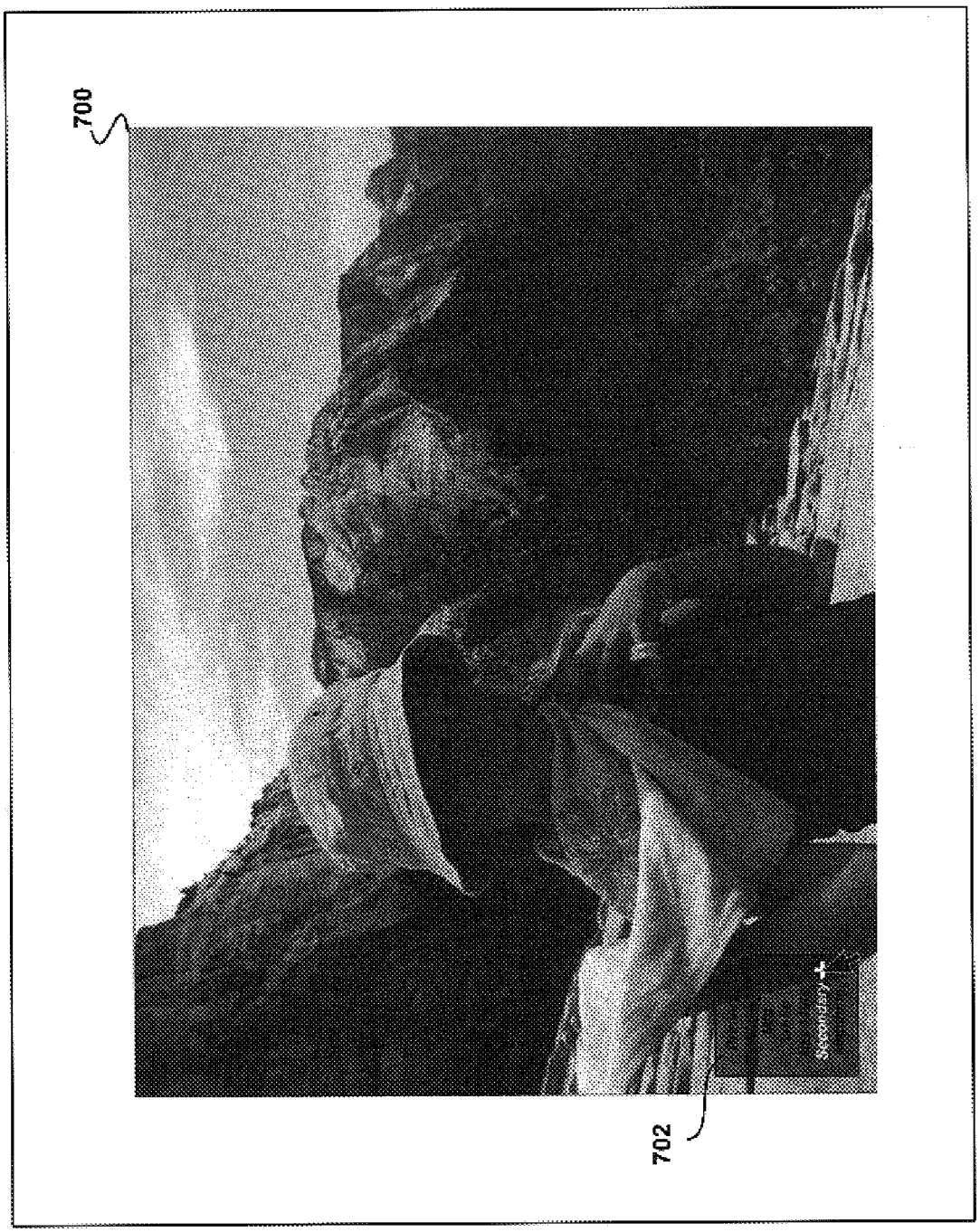
FIGS. 7a-7i are screenshots illustrating exemplary workflows for color correction operations, including masking operations.

FIGS. 7a-7i are screen shots illustrating exemplary workflows for performing color correction operations, including masking operations. As shown in FIG. 7a, a user can select a masking operation through a menu 702 displayed in a digital image 700 to be corrected (i.e., a secondary correction option). Other selection mechanisms are possible. The menu 702 can be displayed in response to a mouse over or other user input (e.g., pressing a hot key or key combination).

Figure 7B:
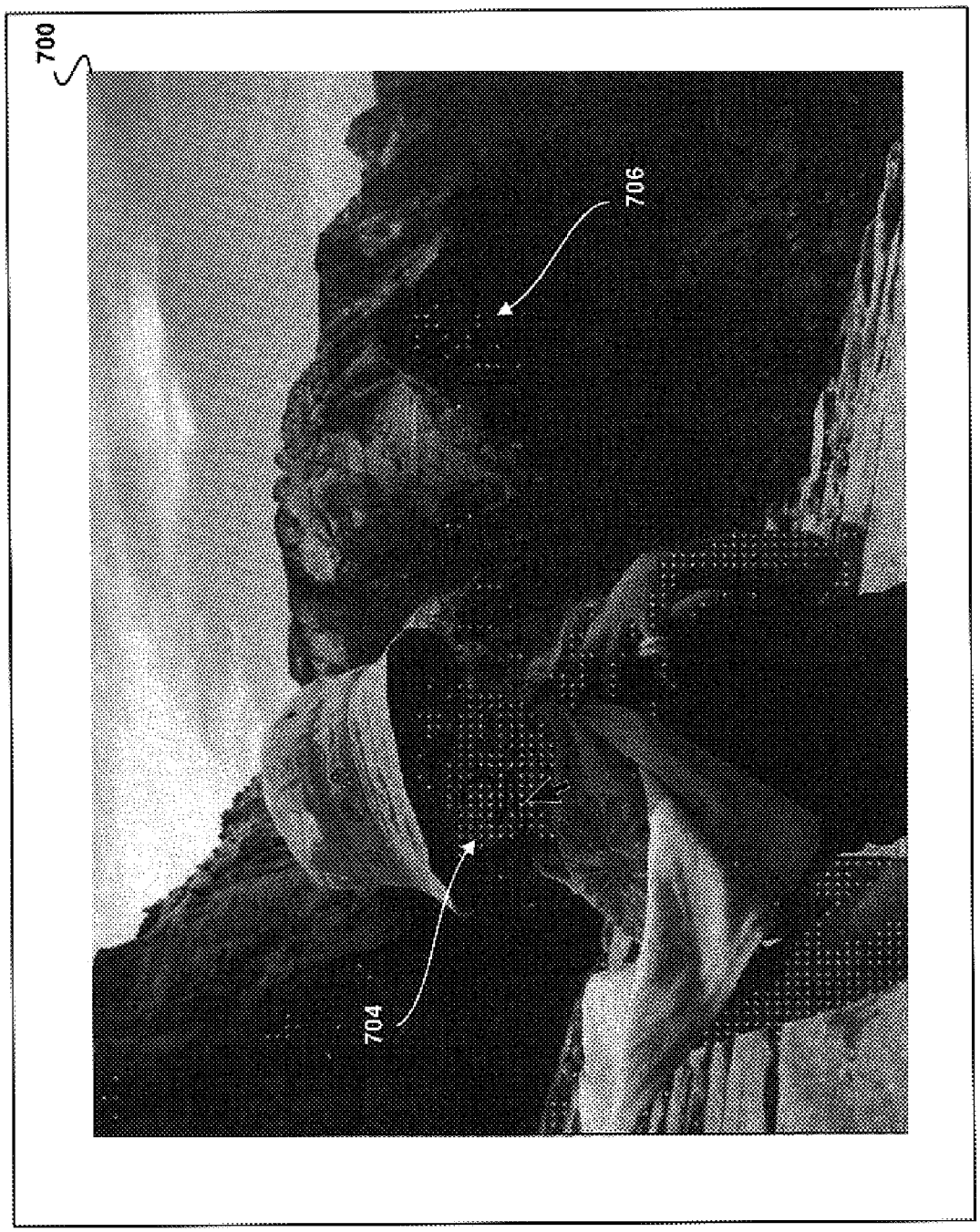

In some implementations, the user can perform pixel sampling based on a stroke 704, as shown in FIG. 7b. For example, a cursor can be used to draw a stroke across a portion of the digital image 700, resulting in the pixels in the path of the stroke being sampled. Based on this sample, other pixels in the digital image 700 are visually identified by a dot overlay 706. As previously described with respect to FIG. 1, the size of the dots in the dot overlay 706 can provide a visual indication of density. As the user moves the cursor over the digital image 700, the dot overlay 706 is updated to account for newly sampled pixels.

Figure 7C:

In response to user input, (e.g., activation of a hot key) the color can be removed from the digital image 700, as shown in FIG. 7c. Removing the color can provide a user with a better picture of the distribution of pixels in the digital image 700 that fall within the selected range. In response to another user input (e.g., deactivation of the hotkey), the color can be returned to the digital image 700.

Figure 7D:
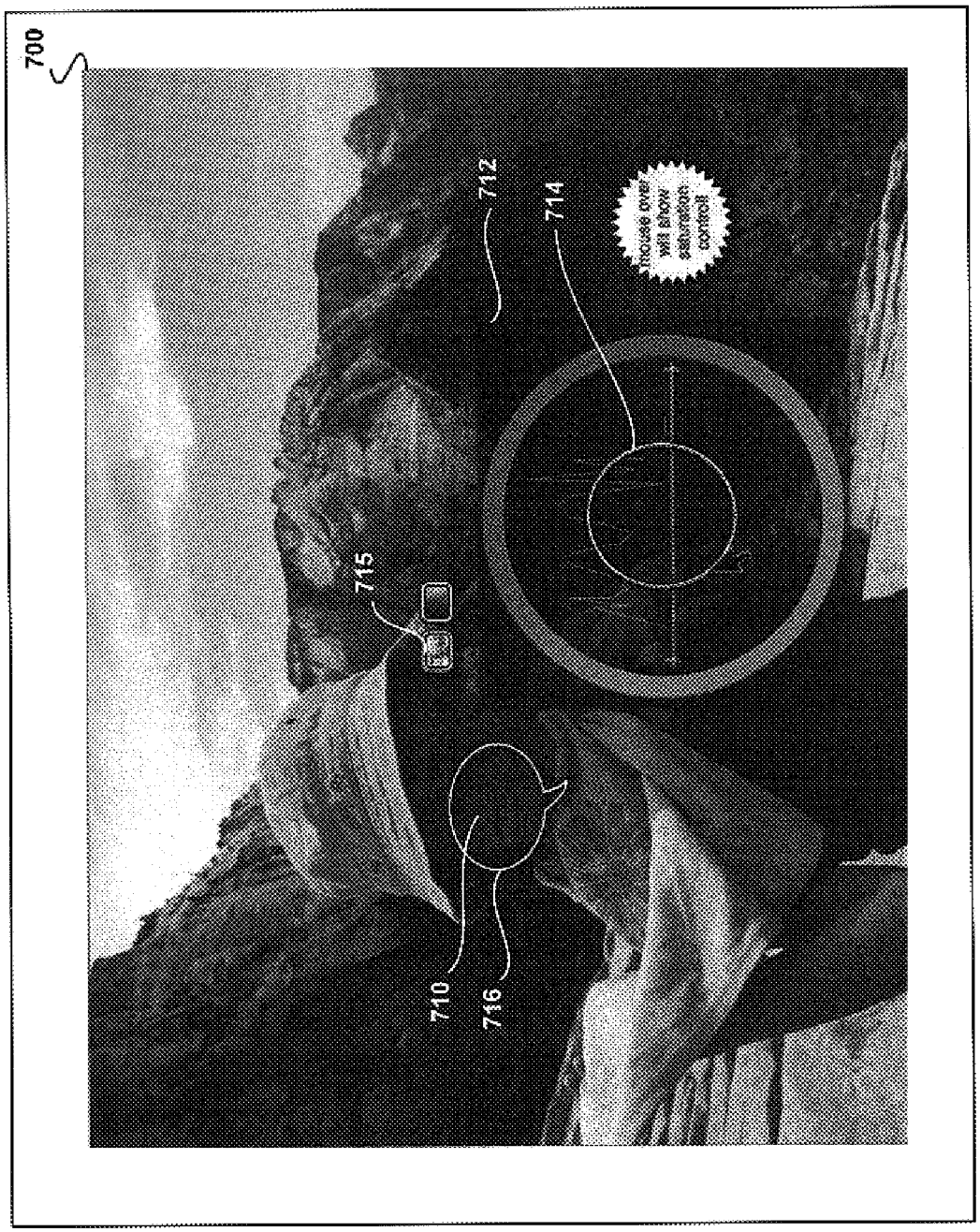

Referring to FIG. 7d, in response to user input (e.g., clicking on the sample area), a correction interface 712 is displayed over the digital image 700 to enable the user to focus on the digital image 700 when performing correction operations. In this example, a selection tag 716 is displayed to remind the user of the currently active region. Selection tags 716 can assist the user in keeping track of multiple selected regions in the digital image 700, in addition to reminding the user of the currently active region.

In some implementations, the user can mouse over the correction interface 712 to display a saturation control wheel 714 for adjusting the saturation of pixels in the digital image 700 that have values that fall within the selected region 710. In the example shown, the user can adjust saturation by clicking and dragging the control wheel 714 in an outward or inward direction (i.e., changing the diameter of the wheel). The type of selection interface and controls that are displayed can be determined automatically based on the user's initial selection. In some implementations, the user's initial selection is interpreted to determine the correction the user is intending to make. A heuristic engine can be populated with data from expert level colorists for making this interpretation.

Saturation Compression

In some implementations, the adjustment of saturation can be improved using saturation compression, where saturation adjustments are applied on de-saturated pixels more than saturated pixels. When a user adjusts saturation some of the pixels may already be saturated and saturating those pixels further will result in an undesirable color correction. This problem can be solved by adjusting de-saturated pixels more than saturated pixels. In some implementations, the user is provided with a saturation control (e.g., wheel, slider, curve, dial, etc.). The control can determine how strong the effect will be on certain pixels. For example, when a saturation control is set at 0.0 (no compression), then all pixels will be affected by the same degree of saturation, regardless of the current saturation levels of the pixels. When the control is set at 1.0 (maximum compression), then pixels with current saturation values of 0.0 will receive full saturation, while pixels with current saturation values greater than or equal to 0.5 will not receive saturation. Pixels with current saturation values between 0.0 and 0.5 will get a percentage of the saturation. For example, pixels with current saturation levels below 0.25 will get half the saturation they would normally receive at a current saturation level of 0.0. The control can be set by the user or programmatically to lie between 0.0 and 1.0. The saturation levels to be applied can be pre-calculated as a function of the position of the control, and those values can be stored in a LUT or other data structure. The numbers described above are examples used to describe saturation compression. Other numbers are possible.

3D Histogram Tool Integrated into Digital Image

Figure 7E:
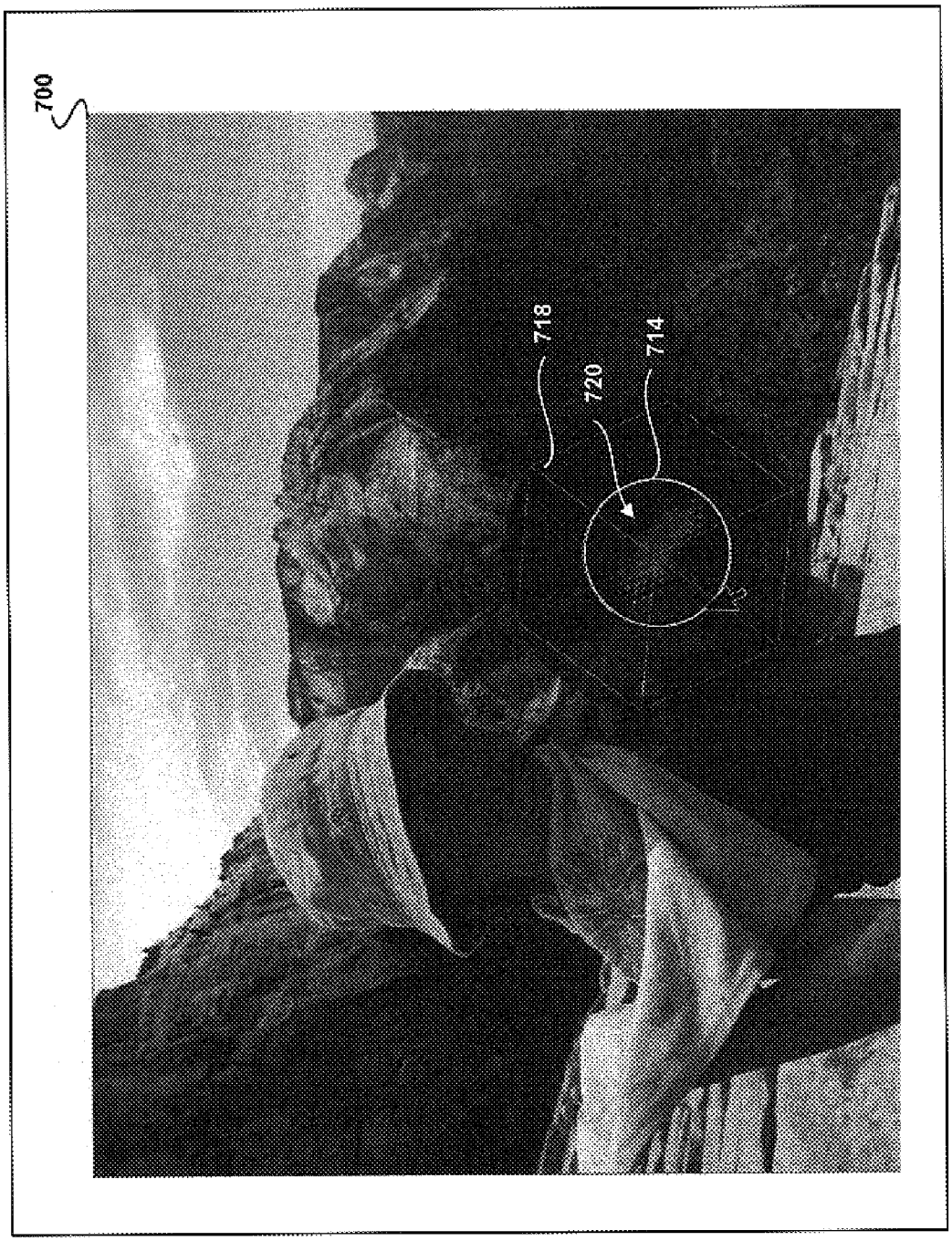

In some implementations, when the user clicks on the saturation control wheel 714 a 3D histogram 718 is displayed on the digital image 700, as shown in FIG. 7e. The 3D histogram 718 includes a cube model defining the color space for the digital image 700. For example, in an RGB color system, the cube model can be formed from three mutually orthogonal axes representing contributions of Red, Green and Blue. Inside the cube model is a visual indicator of the distribution of pixels in the digital image 700 with values that fall within the selected region 710. In some implementations, the color distribution can be represented by proxy elements 720. Proxy elements are graphical objects (e.g., spheres, cubes, etc.) that are displayed in varying numbers and sizes to represent pixel density for a particular image characteristic in the color space. The user can rotate the 3D histogram 718 to see different perspectives of the distribution. 3D histograms can be generated for a variety of color space coordinate axes. 3D histograms for color correction are described more fully in co-pending U.S. patent application Ser. No. 11/408,741, entitled "3D Histogram and Other User Interface Elements for Color Correcting Images."

Figure 7F:
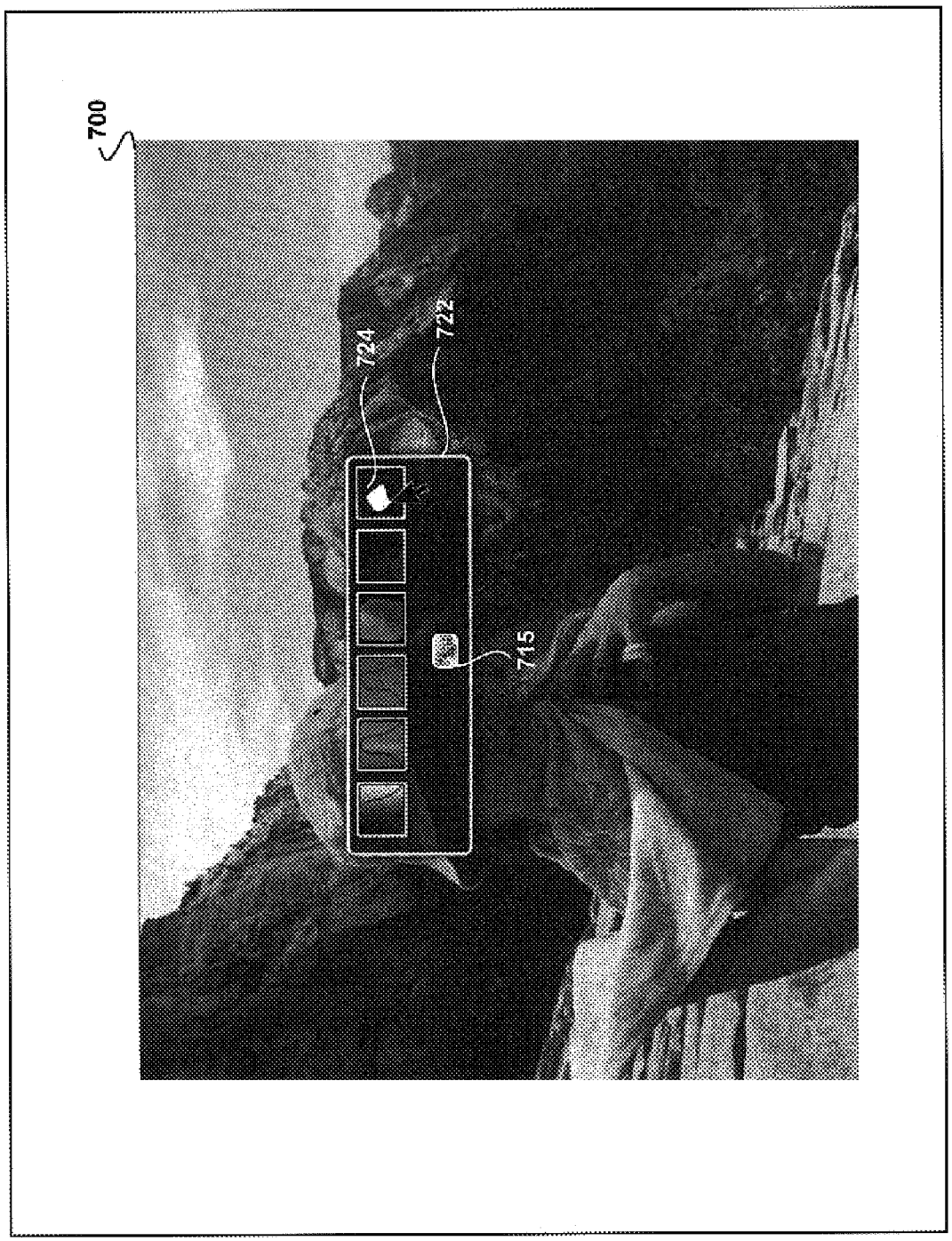
Figure 7G:
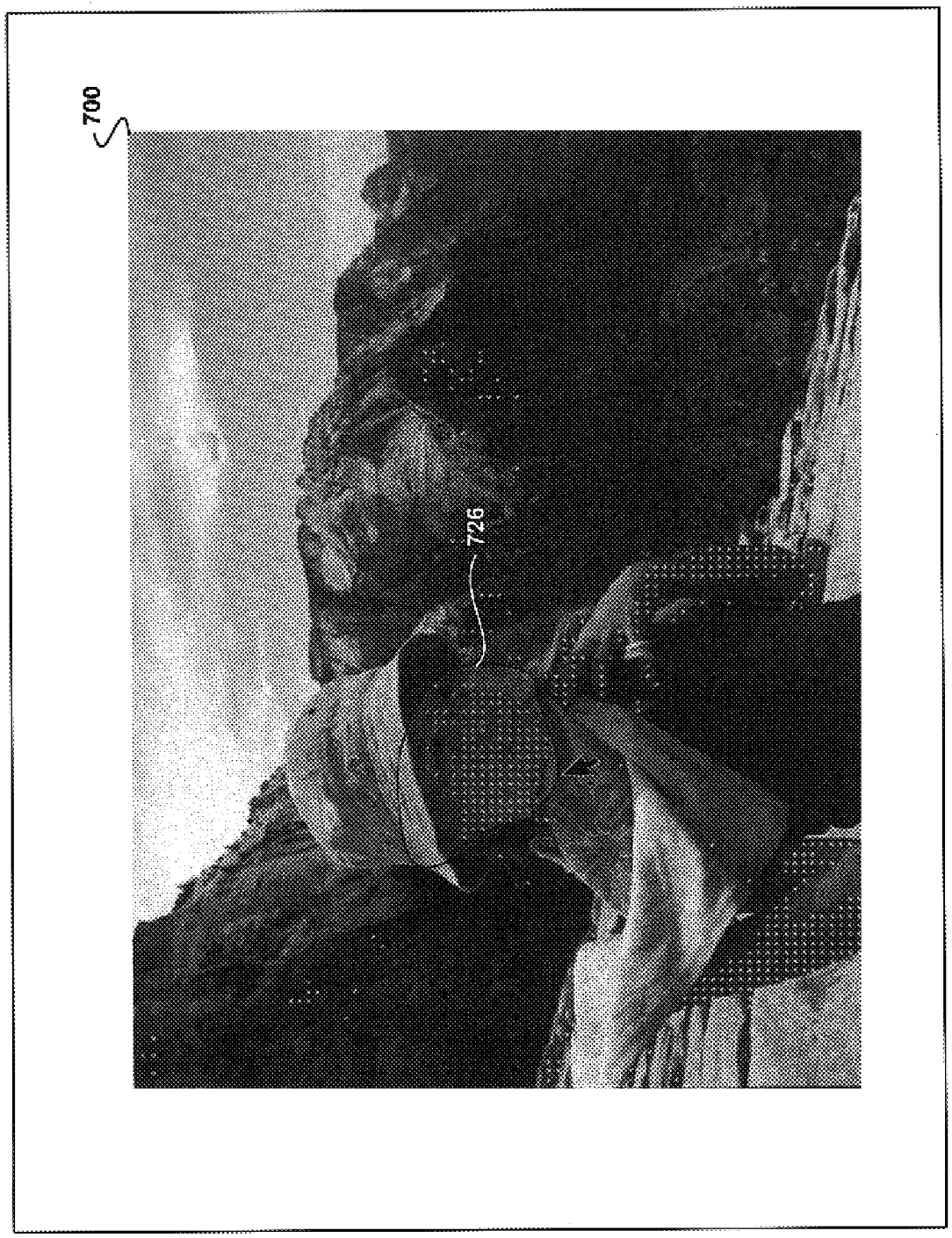
Figure 7H:
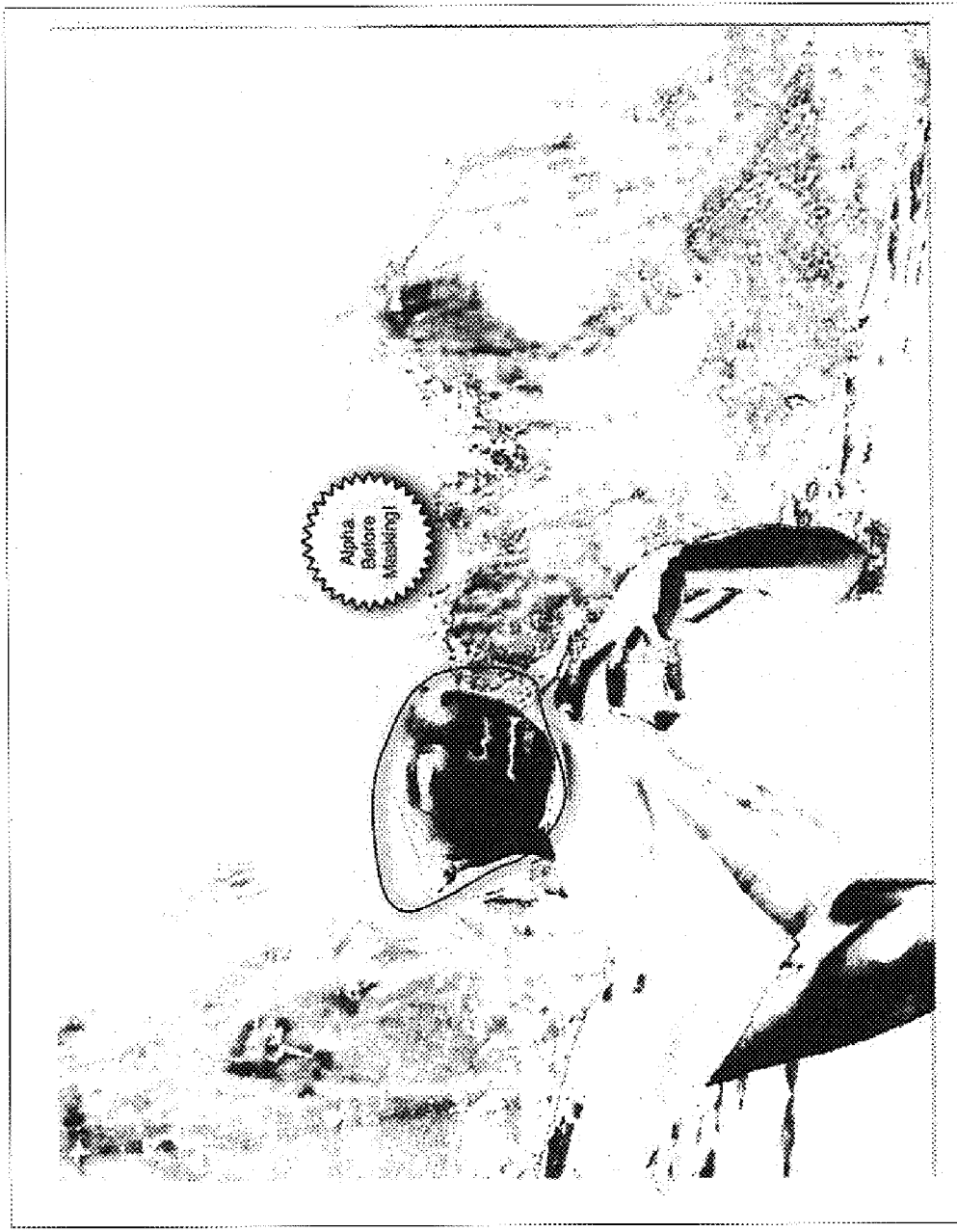
Figure 7I:
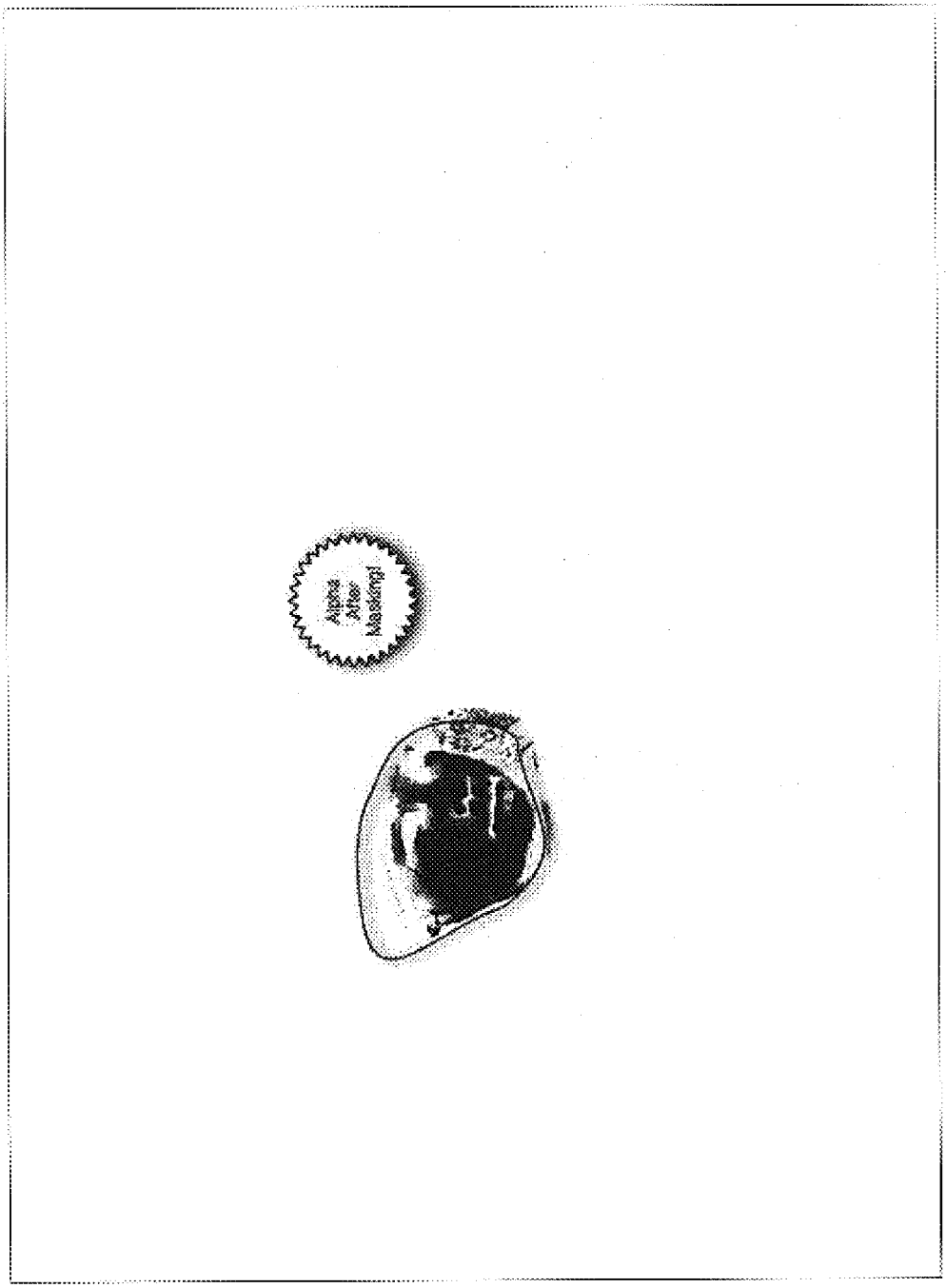

Referring to FIG. 7f, in some implementations the user can click on a selection navigator button 715 to display a selection navigation pane 722 that includes icons for various selection modes. For example, when the user clicks on the masking icon 724, a masking mode is entered, as shown in FIG. 7g. The user can use a cursor to draw a mask 726 over a portion of the digital image 700 to be masked. In the example shown, a mask was drawn around the subject's face. After the mask is drawn, and upon receipt of user input (e.g., activation of a hotkey), the alpha mask for the image is displayed, as shown in FIG. 7h. Upon additional user input (e.g., activating a different hot key), the mask is applied to the digital image 700 and the masked portion of the digital image is displayed in black and white, as shown in FIG. 7i.

3D LUT for Color Correction Operations

The improved workflows described in FIGS. 1-7 enable a user to make primary and secondary color corrections to a digital image with real-time responsiveness by using a 3D LUT to process the digital image and apply the corrections. 3D LUTs have been used by others to perform monitor calibration in color management applications. In the disclosed implementations, however, 3D LUTs are used to perform color corrections, including concatenation of secondary adjustments and matte calculations for regions of interest (e.g., using a keyer). Real-time responsiveness enables a user to adjust a selected range based on visual feedback by seeing the correction results in real-time, and to refine the results until the desired corrections are achieved.

A color space (e.g., RGB, HLS, CMY, Lab, etc.) can be defined by a cube model having three mutually orthogonal sides or axes. In RGB color space, for example, the position of a color value can be represented in the RGB color space by a vector having Red, Green and Blue components. The cube model can comprise the entire color space and include a plurality of smaller cubes (referred to as "voxels"). The voxels can be aligned within the RGB cube in a 3D grid pattern, resembling a Rubik's Cube®, as illustrated in FIG. 8a.

To determine the correction to be applied to a color located inside a particular voxel 802, a trilinear interpolation is performed based on the colors found at the eight corners of the voxel 802. Trilinear interpolation is a well-known technique for linearly interpolating points within a volumetric dataset. For purposes of explanation, the voxel 802 can have its lower/left/base vertix at the origin, as shown in FIG. 8b. Note that voxels can be translated to different locations within the RGB cube model and scaled to different sizes. At each vertex of the voxel 802 is a color corrected value. These values are denoted $V_{000}, V_{100}, V_{010}, \ldots, V_{111}$. A color value at position (x, y, z) within the voxel 802 is denoted $V_{xyz}$ and is given by $$V_{xyz} = V_{000}(1-x)(1-y)(1-z) + V_{100}x(1-y)(1-z) + V_{010}(1-x)y(1-z) + V_{001}(1-x)(1-y)z + V_{101}x(1-y)z + V_{011}(1-x)yz + V_{110}xy(1-z) + V_{111}xyz.$$

A 3D LUT is a mesh around a cube model defining a color space. In some implementations, a 17×17×17 mesh can be used, resulting in 4913 intersecting points that will be color corrected. Since this number of color corrections is far less than the total amount of pixels found in a typical digital image, the 3D LUT provides a significant computational advantage over techniques that color correct every pixel in an image using for example, conventional transformation techniques. Each point of intersection of the mesh can be positioned at a corner of the nearest voxel in the cube defining the color space. When an image is processed using the 3D LUT, a new color corrected value is derived using trilinear interpolation based on the corrected colors found at the corners of the voxel containing the new color value.

Unbounded 3D LUT

Figure 8D:
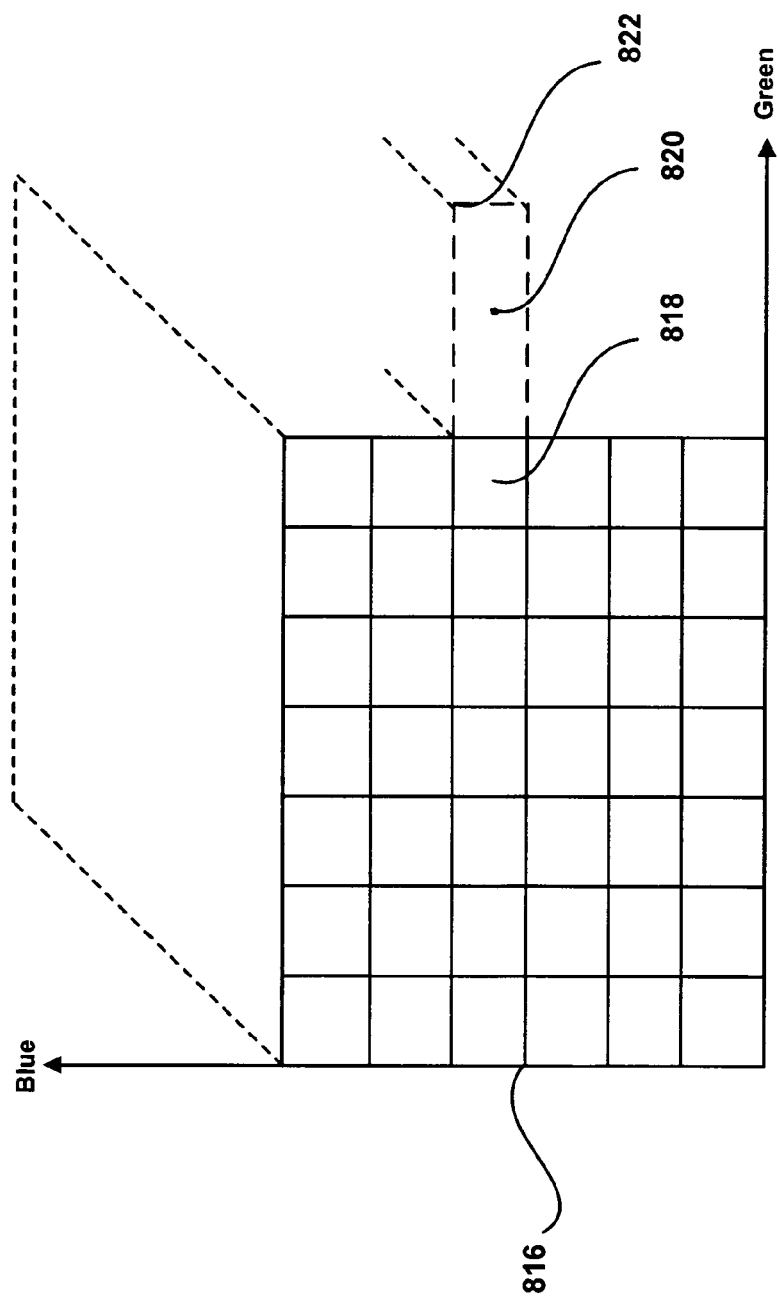
FIG. 8d illustrates the concept of an unbounded 3D LUT for use in color correction.

FIG. 8d illustrates the concept of an unbounded 3D LUT. If the user wants to correct a color value 820 that is outside the range of the bounded 3D LUT (i.e., outside the model cube 816), then one or more dimensions of the closest voxel 818 to the color in the model cube 816 are extrapolated to provide an extended voxel 822.

Figure 8E:
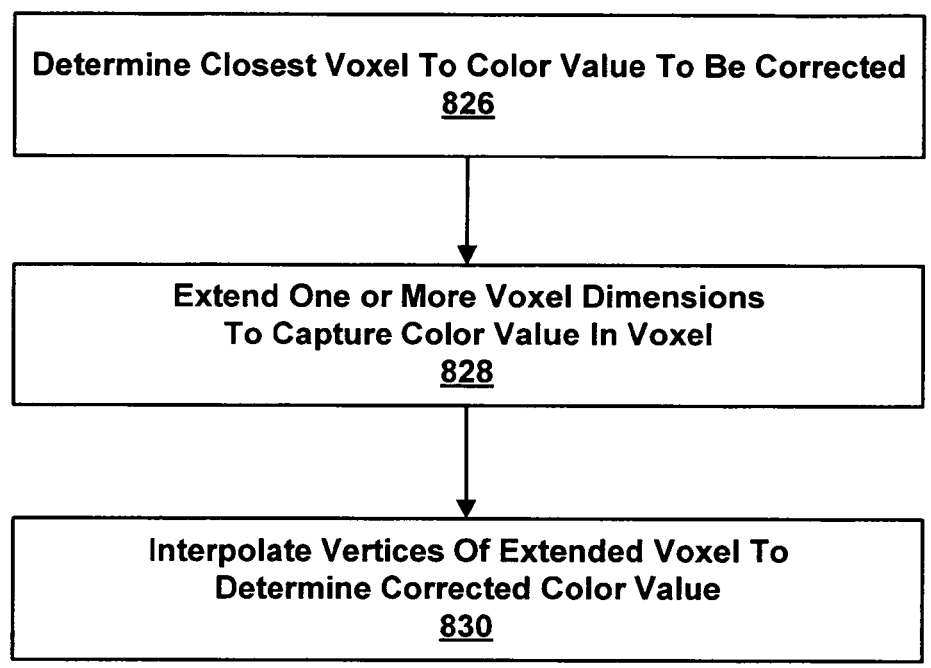
FIG. 8e is a flow diagram of an exemplary unbounded 3D LUT color correction process.

A flow diagram of an unbounded 3D LUT color correction process 824 is shown in FIG. 8e. When a color value outside the 3D LUT is to be corrected, the voxel in the model cube that is closest to the color value is determined (826). One or more dimensions or axes of the voxel are extrapolated to provide an extended voxel (828). The vertices of the extended voxel can then be interpolated (e.g., using trilinear interpolation) to produce the desired color value (830).

3D LUT Precision Issue Detection and Resolution

Figure 9A:
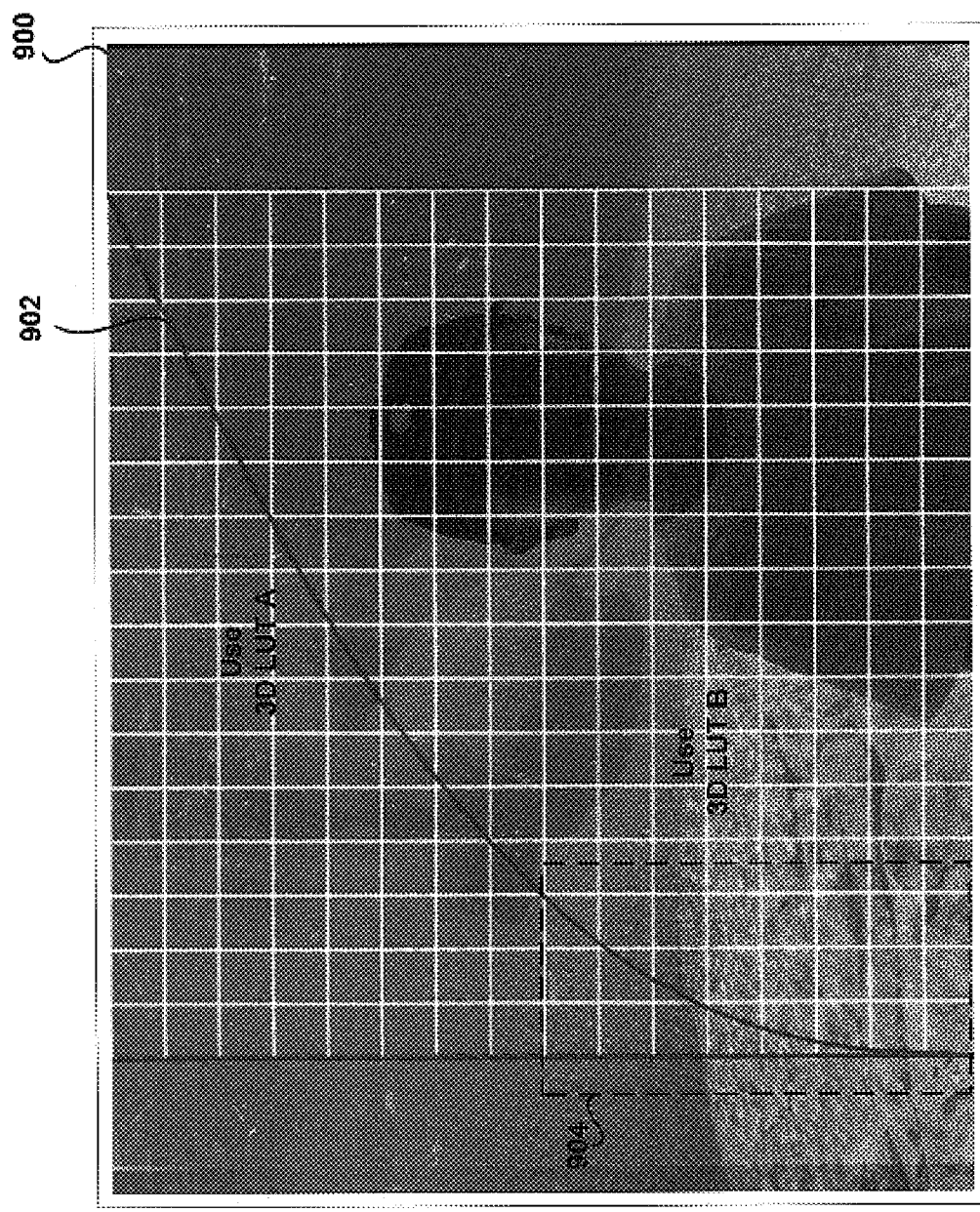
FIG. 9a is a screenshot illustrating a precision issue associated with 3D LUTs that arises during trilinear interpolation.
Figure 9B:
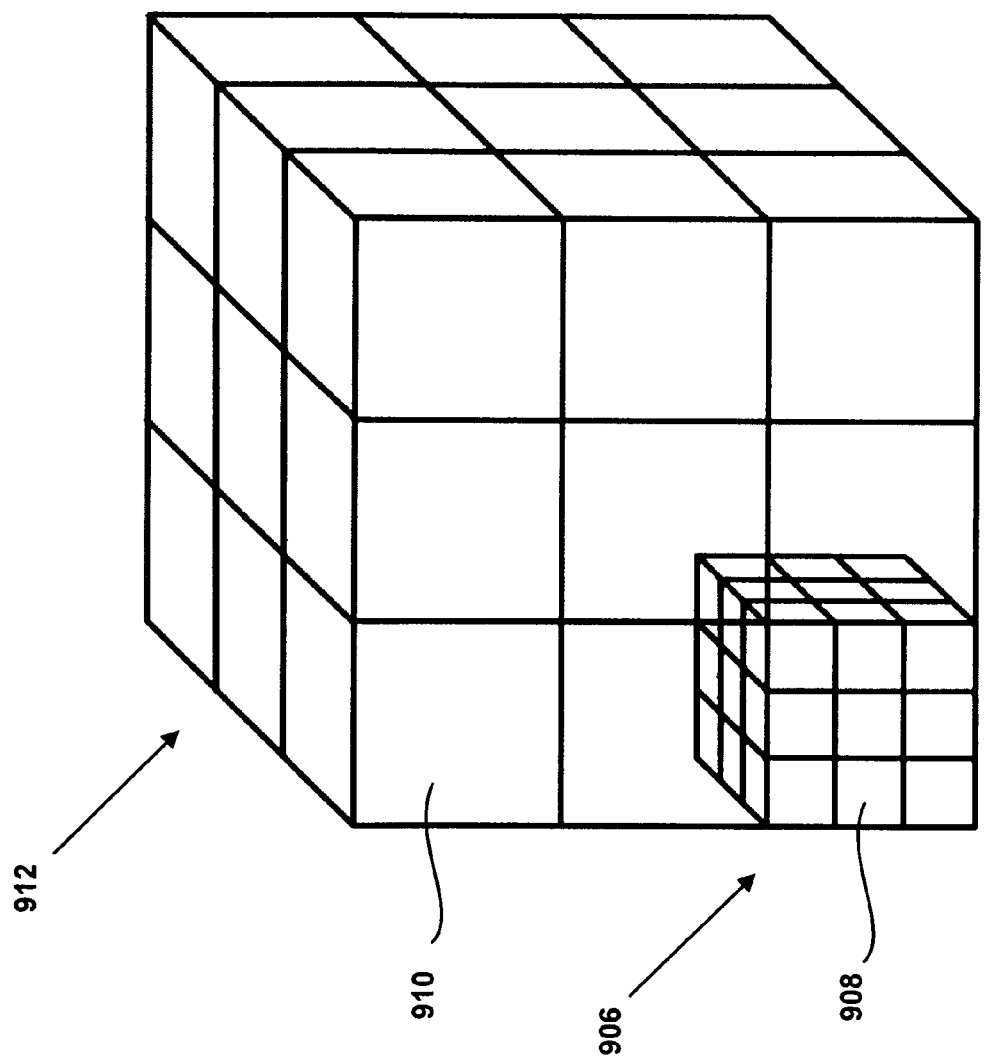
FIG. 9b illustrates the use of multiple 3D LUTs to address precision issues.

FIG. 9a is a screenshot illustrating a precision problem with 3D LUTs that arises during trilinear interpolation. In the example shown, a digital image 900 requires an exposure adjustment. An exposure curve 902 is displayed over the digital image 900. When the user corrects the exposure curve 902, the adjustments are used to update the 3D LUT, i.e., update the mesh intersections with newly corrected exposure values. In some cases, trilinear interpolation can be imprecise if interpolation is performed over a non-linear portion 904 of the exposure curve 902. In some implementations, this problem is addressed by using a different 3D LUT, which performs trilinear interpolation within smaller voxels. FIG. 9b illustrates the concept of using a 3D LUT 906 (3D LUT B) with smaller voxels 908 to trilinear interpolate over the non-linear portion 904 of the exposure curve 902. The larger 3D LUT 912 (3D LUT A) with larger voxels 910 could be used on the linear portion of the exposure curve 902.

Figure 10:
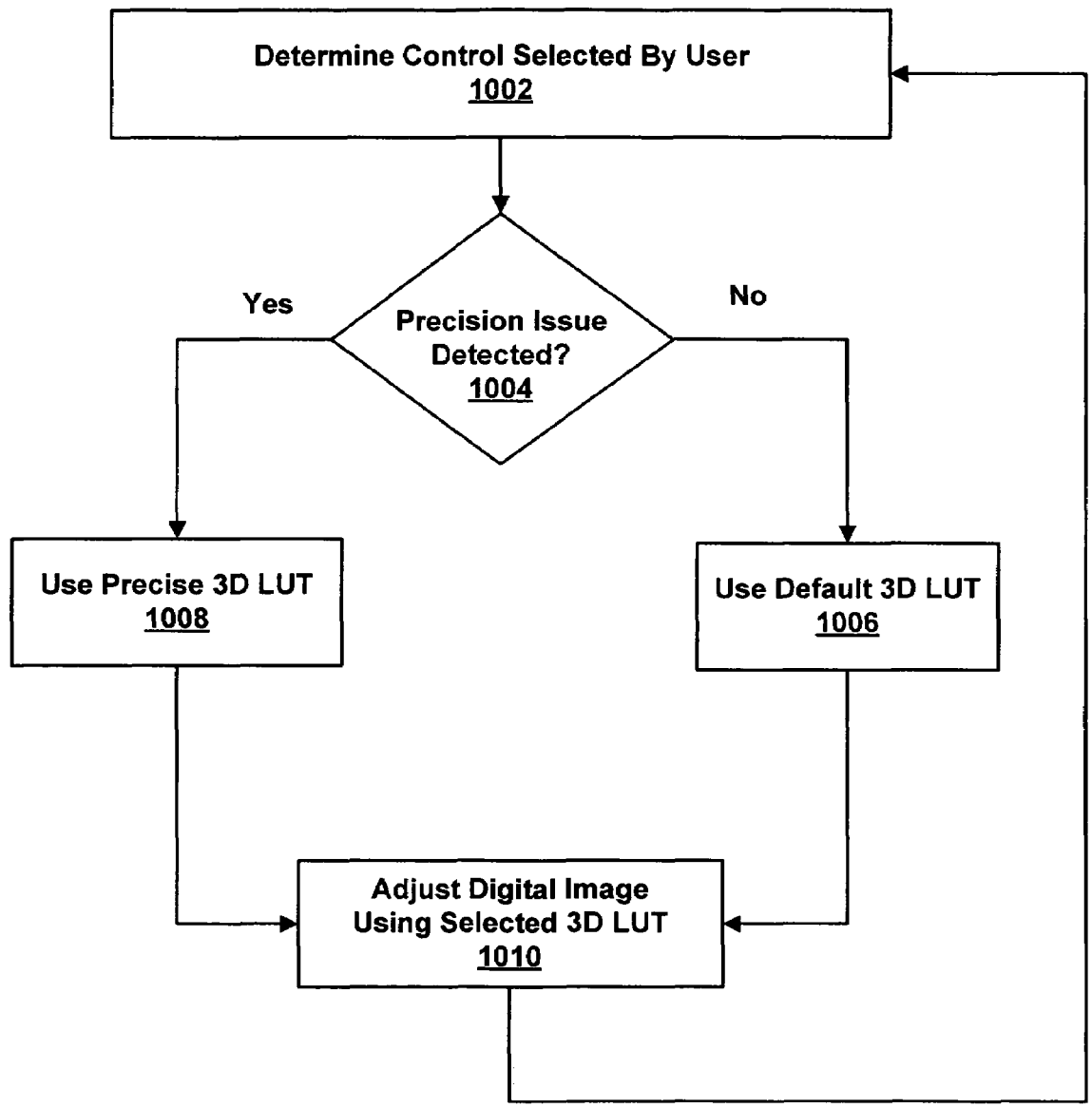
FIG. 10 is a flow diagram of an exemplary 3D LUT selection process.

FIG. 10 is a flow diagram of an exemplary 3D LUT selection process 1000. In some implementations, a user attempts a color correction using a control, such as the exposure curve 902 previously described with respect to FIG. 9. The process 1000 determines which type of control was operated by the user and the selected range of operation (1002). If the selected control and range are likely not to cause imprecision during 3D LUT processing (1004), then a default 3D LUT is used to process the digital image (1006). Otherwise, a more precise 3D LUT which uses smaller voxels can be used to process the digital image (1008). In some implementations, smaller voxels can be generated by scaling the voxels used in the default 3D LUT. After the appropriate 3D LUT is selected, it is used to adjust the digital image (1010).

Exemplary Processing Pipeline Incorporating 3D LUTs

Figure 11:
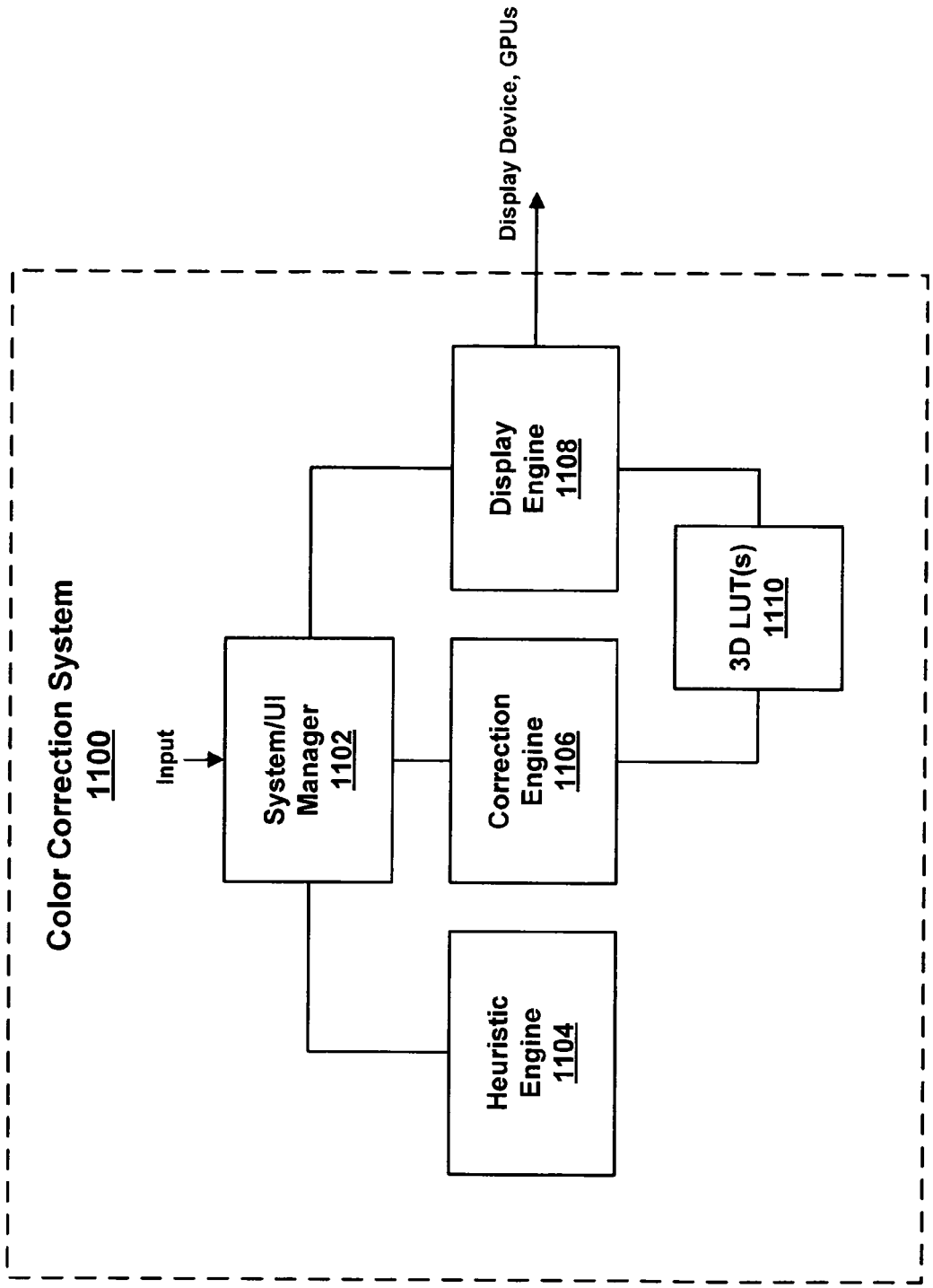
FIG. 11 is a block diagram of an exemplary processing pipeline incorporating 3D LUTs.

FIG. 11 is a block diagram of an exemplary color correction system 1100. The color correction system 1100 includes a system/UI manager 1102, a heuristic engine 1104, a correction engine 1106, a display engine 1108 and one or more 3D LUTs 1110. The system/UI manager 1102 receives user input (e.g., control inputs) from a UI and sends the input to the heuristic engine 1104 and/or the correction engine 1106 depending upon the type of input and the current mode of the system 1100. For example, if the user selects a range of pixel values from a digital image, the system/UI manager 1102 sends the sample range to the heuristic engine 1104 to be analyzed. The heuristic engine 1104 uses, for example, data from expert level colorists to determine an intended correction based on the sample range. For example, if the pixels are mostly black or dark, the heuristic engine 1104 may interpret the intended correction to be a luminance range adjustment. The heuristic engine 1104 informs the system/UI manger 1102 of the intended selection. The system/UI manager 1102 instructs the display engine 1108 to present a correction interface populated with the appropriate controls based on the luminance selection in the digital image. This same process can apply to hue and saturation corrections based on a selected sample range.

When the correction interface is displayed, the user can make adjustments using one or more controls in the correction interface (e.g., a slider, button, editable curve, etc.). User interactions with the controls are received by the system/UI manager 1102 and sent to the correction engine 1106. The correction engine 1106 includes various algorithms for generating color corrections, such as matrix transformations, color space warping and the like. The correction engine 1106 also determines new color values for 3D LUT 1110. The 3D LUT can be initialized by the system/UI manager 1102 with color values upon the loading of the digital image. The 3D LUT can be initialized by applying color correction to every color presented by the index of the 3D LUT. The digital image can be rapidly processed by the display engine 1108 which replaces pixel values in the digital image that are in the sample range with corrected values provided by the 3D LUT. In some implementations, when the 3D LUT is applied all of the pixels of the digital image are affected. Some pixels of the digital image may be unaffected by the 3D LUT if the initial color represented by the indices (x, y, z) are the same colors at the vertices of the voxel. In some implementations, the corrected values can be the result of trilinear interpolation, as described with respect to FIGS. 8a and 8b.

User System Architecture

Figure 12:
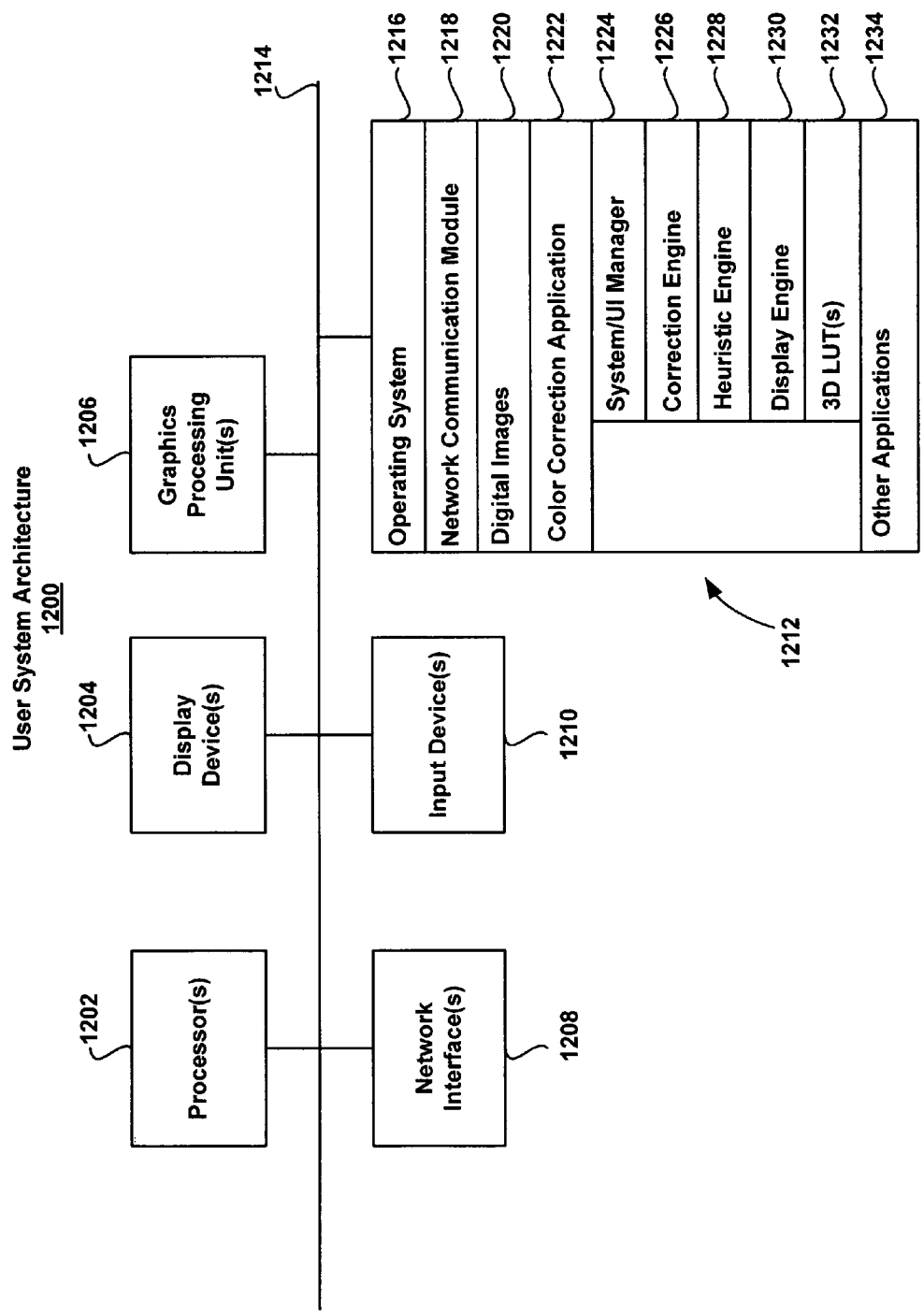
FIG. 12 is a block diagram of an exemplary user system architecture.

FIG. 12 is a block diagram of an exemplary user system architecture 1200 for hosting the color correction system 1100. The architecture 1200 includes one or more processors 1202 (e.g., IBM PowerPC®, Intel Pentium® 4, etc.), one or more display devices 1204 (e.g., CRT, LCD), one or more graphics processing units 1206 (e.g., NVIDIA® Quadro FX 4500, GeForce® 7800 GT, etc.), one or more network interfaces 1208 (e.g., Ethernet, FireWire, USB, etc.), one or more input devices 1210 (e.g., keyboard, mouse, etc.), and one or more computer-readable mediums 1212 (e.g. SDRAM, optical disks, hard disks, flash memory, L1 or L2 cache, etc.). These components exchange communications and data via one or more buses 1214 (e.g., EISA, PCI, PCI Express, etc.).

The term "computer-readable medium" refers to any medium that participates in providing instructions to a processor 1202 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 1212 further includes an operating system 1216 (e.g., Mac OS®, Windows®, Linux, etc.), a network communication module 1218, one or more digital images or video clips 1220 and a color correction application 1222. The color correction application 1222 further includes a system/UI manager 1224, a correction engine 1226, a heuristic engine 1228, a display engine 1230 and one or more 3D LUTs 1232. Other applications 1234 can include any other applications residing on the user system, such as a browser, compositing software (e.g., Apple Computer Inc.'s Shake® digital compositing software), a color management system, etc. In some implementations, the color correction application 1222 can be integrated with other applications 1234 or be configured as a plug-in to other applications 1234.

The operating system 1216 can be multi-user, multiprocessing, multitasking, multithreading, real-time and the like. The operating system 1216 performs basic tasks, including but not limited to: recognizing input from input devices 1210; sending output to display devices 1204; keeping track of files and directories on computer-readable mediums 1212 (e.g., memory or a storage device); controlling peripheral devices (e.g., disk drives, printers, GPUs 1206, etc.); and managing traffic on the one or more buses 1214. The network communications module 1218 includes various components for establishing and maintaining network connections (e.g., software for implementing communication protocols, such as TCP/IP, HTTP, Ethernet, etc.). The digital images 1220 can be a video clip of multiple digital images or a single image. The color correction application 1222, together with its components, implements the various tasks and functions, as described with respect to FIGS. 1-11. If the GPUs 1206 have built-in support to process 3D meshes, the 3D LUT operations are preferably performed by the GPUs 1206 to improve system performance.

The user system architecture 1200 can be implemented in any electronic or computing device capable of hosting a color correction application, including but not limited to: portable or desktop computers, workstations, main frame computers, network servers, etc.

Various modifications may be made to the disclosed implementations and still be within the scope of the following claims.

What is claimed is:

1. A computer-implemented method of correcting images, comprising:
    using one or more processors:
        presenting a user interface on a display device, the user interface including a display area;
        presenting a digital image in the display area;
        receiving a selected sample range of pixel values;
        selecting a correction interface from a plurality of correction interfaces based on the selected sample range, where the correction interface includes one or more controls for specifying an intended correction to the digital image;
        overlaying the correction interface on the digital image; and
        performing a correction operation on at least a portion of the digital image in response to a user interaction with the correction interface.

2. The method of claim 1, further comprising:
    populating the correction interface with data based on the intended correction.

3. The method of claim 2, further comprising:
    providing a selection tool operable for selecting the sample range from the digital image; and
    providing visual feedback identifying other pixels in the digital image that are in the selected sample range.

4. The method of claim 3, where the visual feedback is displayed in the digital image.

5. The method of claim 3, where the visual feedback indicates the density of pixels in the digital image that are in the selected sample range.

6. The method of claim 3, where the visual feedback is a dot overlay and the size of the dots in the dot overlay are indicative of the pixel density.

7. The method of claim 6, where the dots are painted to improve visibility.

8. The method of claim 2, where the intended correction is determined based on data from expert level colorists.

9. The method of claim 2, further comprising:
    displaying a visual indicator proximate the selected sample range to indicate that the selected sample range is active.

10. A computer-readable medium having instructions stored thereon which, when executed by a processor, causes the processor to perform the operations of:

presenting a user interface on a display device, the user interface including a display area;
presenting a digital image in the display area;
receiving a selected sample range of pixel values;
selecting a correction interface from a plurality of correction interfaces based on the selected sample range, where the correction interface includes one or more controls for specifying an intended correction to the digital image;
overlaying the correction interface on the digital image; and
performing a correction operation on at least a portion of the digital image in response to a user interaction with the correction interface.

11. The computer-readable medium of claim 10, further comprising:
populating the correction interface with data based on the intended correction.

12. The computer-readable medium of claim 11, further comprising:
providing a selection tool operable for selecting the sample range from the digital image; and
providing visual feedback identifying other pixels in the digital image that are in the selected sample range.

13. The computer-readable medium of claim 12, where the visual feedback is displayed in the digital image.

14. The computer-readable medium of claim 12, where the visual feedback indicates the density of pixels in the digital image that are in the selected sample range.

15. The computer-readable medium of claim 12, where the visual feedback is a dot overlay and the size of the dots in the dot overlay are indicative of the pixel density.

16. The computer-readable medium of claim 15, where the dots are painted to improve visibility.

17. The computer-readable medium of claim 12, where the intended correction is determined based on data from expert level colorists.

18. The computer-readable medium of claim 11, further comprising:
displaying a visual indicator proximate the selected sample range to indicate that the selected sample range is active.

19. A system for correcting images, comprising:
a display engine configurable for presenting a digital image on a display device and for presenting a correction interface overlying the digital image;
a user interface manager configurable to receive a selected sample range of pixel values form the digital image;
a correction engine coupled to the display engine, the correction engine configurable to: select the correction interface from a plurality of correction interfaces based on the selected sample range, where the correction interface includes one or more controls for specifying an intended correction to the digital image; and to display the correction interface on the digital image for performing a correction operation on at least a portion of the digital image in response to a user interaction with the correction interface.

20. The system of claim 19, further comprising:
a heuristic engine coupled to the user interface manager, the heuristic engine configurable to populate the correction interface with data based on the intended correction.

* * * * *